(12) United States Patent
Okamoto et al.

(10) Patent No.: US 9,894,230 B2
(45) Date of Patent: Feb. 13, 2018

(54) IMAGE FORMATION DEVICE WHICH CAN BE EXPANDED AND IMAGE FORMING METHOD FOR EXPANDING AN IMAGE FORMATION DEVICE

(71) Applicant: KYOCERA Document Solutions Inc., Osaka (JP)

(72) Inventors: Kentaro Okamoto, Osaka (JP); Daijiro Kitamoto, Osaka (JP); Koji Ikawa, Osaka (JP); Satoshi Imai, Osaka (JP); Minoru Takahashi, Osaka (JP); Tomonori Naota, Osaka (JP); Katsuji Furushige, Osaka (JP); Tomihito Doi, Osaka (JP); Makoto Kowaka, Osaka (JP); Takashi Murakami, Osaka (JP); Kyota Mitsuyama, Osaka (JP); Wataru Tsukuda, Osaka (JP); Ayaka Ikejima, Osaka (JP); Yosuke Nakazato, Osaka (JP); Masato Hirota, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/127,640

(22) PCT Filed: Apr. 23, 2015

(86) PCT No.: PCT/JP2015/062322
§ 371 (c)(1),
(2) Date: Sep. 20, 2016

(87) PCT Pub. No.: WO2015/182303
PCT Pub. Date: Dec. 3, 2015

(65) Prior Publication Data
US 2017/0223208 A1    Aug. 3, 2017

(30) Foreign Application Priority Data

May 30, 2014  (JP) ................................ 2014-113088
May 30, 2014  (JP) ................................ 2014-113090
(Continued)

(51) Int. Cl.
*G06F 3/12*     (2006.01)
*H04N 1/00*     (2006.01)
*G06F 9/445*    (2018.01)

(52) U.S. Cl.
CPC ........... *H04N 1/00938* (2013.01); *G06F 8/61* (2013.01); *H04N 1/0097* (2013.01);
(Continued)

(58) Field of Classification Search
CPC .......... H04N 1/00938; H04N 1/00411; H04N 1/0097; H04N 1/00464; H04N 2201/0094; G06F 8/61
See application file for complete search history.

(56) References Cited

U.S. PATENT DOCUMENTS

2002/0054326 A1* 5/2002 Morita ...................... G06F 8/60
                                                358/1.15
2004/0143835 A1* 7/2004 Dattke ................ G06F 9/44526
                                                719/315
(Continued)

FOREIGN PATENT DOCUMENTS

| JP | 2002-073340 A | 3/2002 |
| JP | 2002-082806 A | 3/2002 |
| JP | 2007-318562 A | 12/2007 |
| JP | 2008-204270 A | 9/2008 |
| JP | 2011-170639 A | 9/2011 |
| JP | 2014-059718 A | 4/2014 |

*Primary Examiner* — Benny Q Tieu
*Assistant Examiner* — Juan M Guillermety
(74) *Attorney, Agent, or Firm* — Hawaii Patent Services; Nathaniel K. Fedde; Kenton N. Fedde

(57) ABSTRACT

Provided is an image formation device with which expanded is easy and the development cost can be reduced. A device control platform manages hardware resource in an operating
(Continued)

system. A standard application service interface unit provides an interface for utilizing a standard application function from outside of a standard application execution unit. A platform service interface unit provides an interface for utilizing hardware resource from the outside of the device control platform. A standard function service enables the use of the standard application functions corresponding to the standard application service interface unit. An expanded function service enables the use of the hardware resource corresponding to the platform service interface unit. An expanded application management unit manages and executes expanded applications capable of calling the standard function service and the expanded function service.

14 Claims, 19 Drawing Sheets

(30) Foreign Application Priority Data

| May 30, 2014 | (JP) | 2014-113091 |
| Jun. 23, 2014 | (JP) | 2014-128379 |
| Jun. 23, 2014 | (JP) | 2014-128380 |

(52) U.S. Cl.
CPC ..... *H04N 1/00411* (2013.01); *H04N 1/00464* (2013.01); *H04N 2201/0094* (2013.01)

(56) References Cited

U.S. PATENT DOCUMENTS

| 2006/0215201 | A1* | 9/2006 | Shimizu | H04N 1/00938 358/1.13 |
| 2007/0273911 | A1 | 11/2007 | Nakajima | |
| 2009/0037930 | A1* | 2/2009 | Shiono | G06F 8/61 719/313 |
| 2009/0103828 | A1* | 4/2009 | Shibukawa | G06K 9/00973 382/260 |
| 2011/0041144 | A1* | 2/2011 | Araki | G06F 9/541 719/328 |
| 2011/0063645 | A1* | 3/2011 | Sugino | G06F 3/1204 358/1.13 |
| 2011/0103819 | A1* | 5/2011 | Sekiya | G03G 15/5075 399/81 |
| 2011/0222100 | A1* | 9/2011 | Tanaka | H04N 1/00413 358/1.14 |
| 2012/0147411 | A1* | 6/2012 | Mori | H04N 1/00474 358/1.14 |
| 2012/0212761 | A1* | 8/2012 | Kuroyanagi | H04N 1/00938 358/1.13 |
| 2013/0042232 | A1* | 2/2013 | Hirokawa | G06F 8/61 717/174 |
| 2013/0174141 | A1* | 7/2013 | Hirokawa | G06F 8/61 717/174 |
| 2014/0082581 | A1 | 3/2014 | Ohhashi | |

* cited by examiner

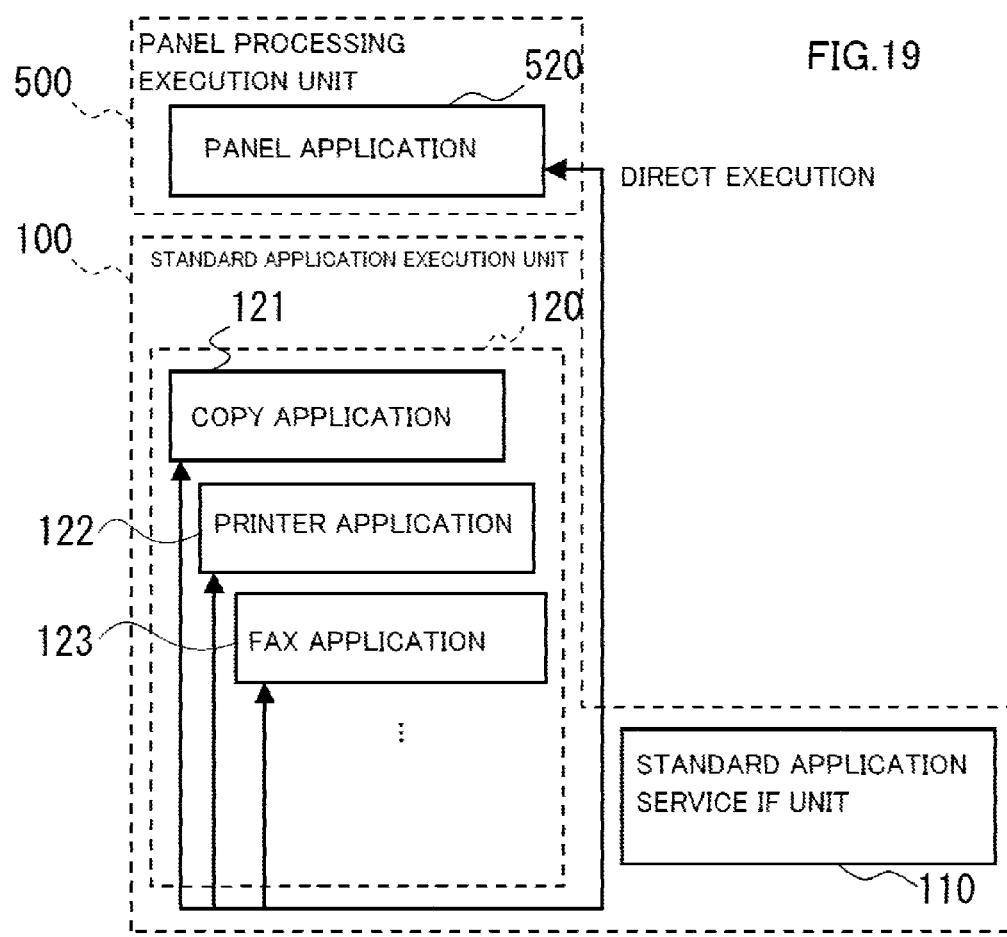

IMAGE FORMATION DEVICE WHICH CAN BE EXPANDED AND IMAGE FORMING METHOD FOR EXPANDING AN IMAGE FORMATION DEVICE

FIELD OF THE INVENTION

The present invention relates to an image formation device and an image forming method, and in particular pertains to an image formation device and an image forming method which are configured to execute applications.

Typically, in image formation devices that include, for example, an MFP (Multifunctional Peripheral) and a printer which are capable of printing documents and images, some are capable of executing application software (hereinafter referred to as "application") after installation thereof.

Thanks to these applications, it is possible to add functions of, for example, PDF creation, business card management, and book management to the image formation device. In addition, an application makes it possible to establish a linkage to a camera or the like.

Patent Literature 1 describes a technique of image formation devices wherein the common part of each application is bound out as an application service and a common system service, a platform is formed with the application service, the common system service and a general purpose OS, and a printer application, a copy application and various applications are mounted on the platform.

PRIOR ART DOCUMENT

Patent Literature

Patent Literature 1: JP2002-82806A

SUMMARY OF THE INVENTION

Problem to be Solved by the Invention

However, in the technique of Patent Literature 1, there is a problem wherein handling time is required for customization (individualization) that is intended to cope with various users' requests, which causes the developing cost to increase.

The present invention, which is made in view of such circumstances, has an object to overcome the foregoing problem.

Means for Solving the Problem

An image formation device of the present invention has a feature to include a device control platform that manages a hardware resource in an operating system, a standard application execution unit that executes a standard application that utilizes of the hardware resource that are under the management of the device control platform, and an expanded application platform that includes a standard function service allowing for a utilization of function of standard application executed by the standard application execution unit, an expanded function service allowing for a utilization of the hardware resource, and an expanded application management unit managing and executing an expanded application that is capable of calling individually the standard function service and the expanded function service.

The image formation device of the present invention has a feature wherein the expanded application platform includes an operating system installation service that adds a function to the operating system.

The image formation device of the present invention has a feature wherein the expanded application platform includes an operating system install service for adding a function to the operating system.

An image forming method of the present invention, which is an image forming method that is executed by an image formation device provided with a hardware resource, has a feature to include the steps of: managing the hardware resource in an operating system, executing a standard application that utilizes the managed hardware resource, and managing and executing an expanded application that enables a utilization of the hardware resource by allowing a function of the executed standard application for utilization.

Effect of the Invention

According to the present invention, it is possible to utilize each of the standard application and the hardware resource from the layered expanded application platforms, which allows for easy customization, resulting in providing image formation devices that with reduced developing cost.

BRIEF DESCRIPTION OF THE DRAWINGS

FIG. 19 is a conceptual illustration of a standard application direct execution shown in FIG. 17.

MODES FOR CARRYING OUT THE INVENTION

First Exemplary Embodiment

[System Configuration of Image Formation Device 1 According to First Exemplary Embodiment]

Figure 1:
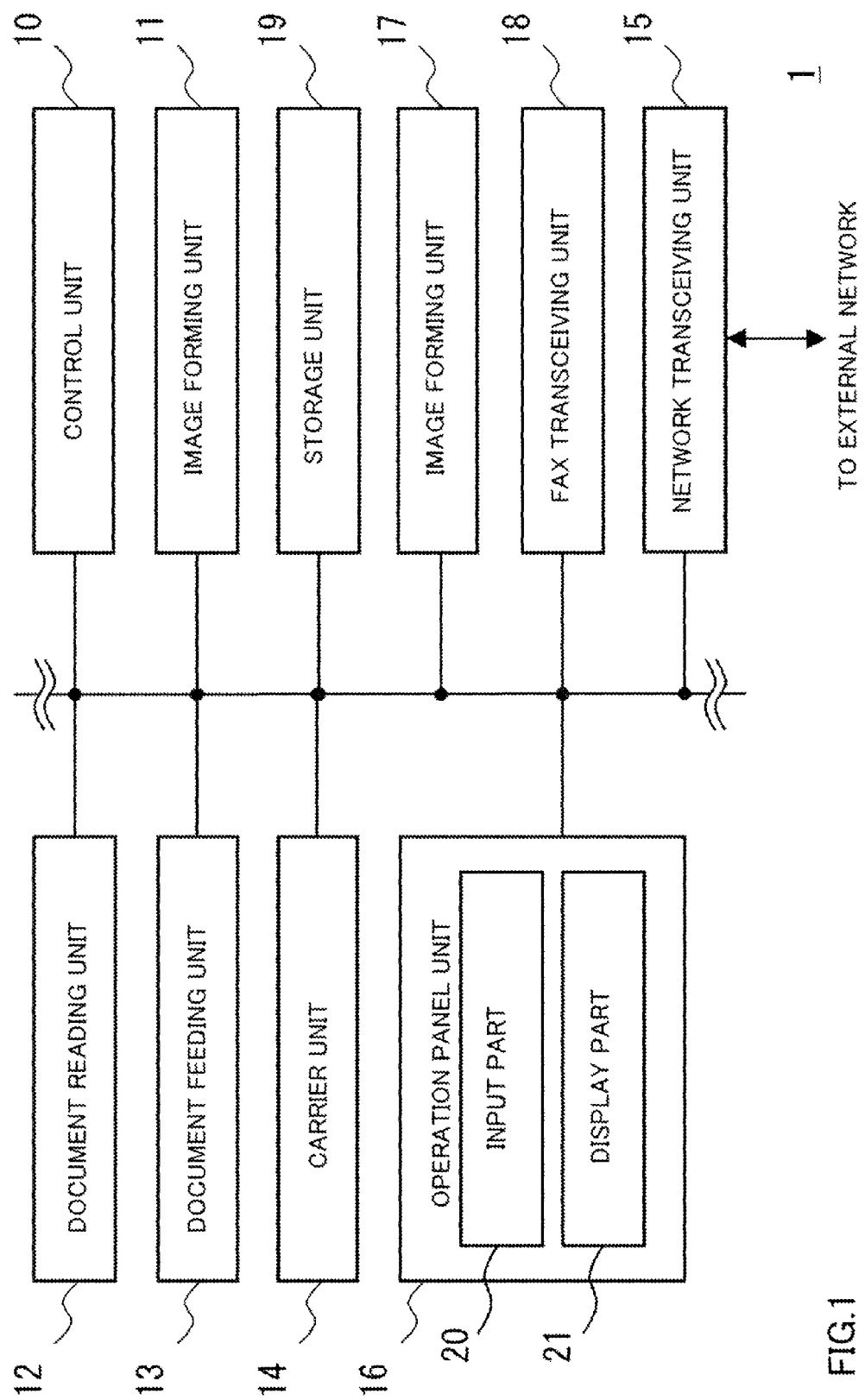
FIG. 1 is a blockdiagram that is illustrative of a system configuration of an image formation device according to a first exemplary embodiment.

Next, with reference to FIG. 1, a description is made as to a system configuration of an image formation device 1 according to a first exemplary embodiment of the present invention. In the image formation device 1, an image processing unit 11, a document reading unit 12, a document feeding unit 13, a carrier unit 14, a network transceiving unit 15, an operation panel unit 16, an image formation unit 17, a FAX transceiving unit 18, a storage unit 19, and the like are connected to a control unit 10. An operation of each of the units is under the control of the control unit 10.

The control unit 10 is an information processing part that is configured by a GPP (General Purpose Processor), a CPU (Central Processing Unit), an MPU (Micro Processing Unit), a DPS (Digital Signal Processor), a GPU (Graphics Processing Unit), an ASIC (Application Specific Processor) or the like.

The control unit 10 reads control programs that are stored in a ROM and an HDD of the storage part 19 and develops the control programs on a RAM for execution thereof, thereby acting as each part of a function block as will be detailed later. The control unit 10 conducts an overall control of the device in response to instruction information that is inputted from an external terminal device, not illustrated, or an operation panel unit 16.

The image processing unit 11 is a control arithmetic unit that is configured by a DSP (Digital Signal Processor), a GPU (Graphic Processing Unit) or the like. The image processing unit 11 executes specific image processing on various image data. The image processing unit 11 executes various image processing tasks that include, for example, an enlargement/reduction, a concentration adjustment, a graduation adjustment, and an image improvement.

The image processing unit 11 stores image that has been read by the document reading unit 12, as printing data, in the storage part 19. At this stage, the image processing unit 11 may convert the printing data into file units of PDF format, TIFFT format, or the like.

The document reading unit 12 reads a set document (scanning).

The document feeding unit 13 feeds the document that has been read by the document reading unit 12. The conveyance unit 14 conveys a recording sheet from a sheet cassette, forms an image at the image forming unit 17, and coveys, then, the resulting recording sheet to a stack tray.

The image formation unit 17 forms an image on the recording sheet, pursuant to a user's output instruction, using the data that is stored in the storage part 19, read by the document reading unit 12, or acquired from the external terminal device.

The network transceiving unit 15 is a network connection unit, which includes, for example, a LAN board or a wireless transceiver for connection with an external network such as a LAN, a wireless LAN, a WAN, a cell phone network, or the like.

The network transceiving unit 15 transmits and receives data via a data communication line, and sends and receives a voice signal via a voice telephone line.

The network transceiving unit 15 may be connected, via the network, to external terminal devices that include, for example, a PC (personal computer), a smart phone, and a PDA (personal data assistant), mobile phone, a server, or the like, all of which are not shown.

The operation panel unit 16 acquires a user's instruction and display various information.

The operation panel unit 16 acquires the user's instruction. This user's instruction includes instructions of installing and using an expanded application 400 (application software) (FIG. 2) which will be described later. Also, it may be possible to allow the user's instruction to input and change information of each of users. For this reason, the operation panel unit 16, which is provided with its dedicated control unit and storage media such as a ROM, a RAM, or the like, may control the GUI (Graphic User Interface) in collaboration with the control unit 10. Installing the expanded application 400 and controlling the operation panel 16 while the device is in use are detailed later.

In addition, the operation panel 16 may be provided with a connection part for connection with data storage media such as USB memories or flash memory cards, or an external device with a built-in data storage media.

The operation panel unit 16 is also provided with an input part 20 and a display part 21. The input part 20 acquires a user's instruction via a touch panel and buttons. The buttons of the input part 20 may include a start key, a cancel key, and numeric keys. The buttons of the input part 20 may include operation mode switching buttons of, for example, copying, FAX transmission, and scanning, and instruction buttons related to job executions of, for example, printing, transmission and recording of a selected document. In addition the touch panel of the input part 20 may detect coordinates on which the user presses and a pressure thereof based on resistive film technology or electrostatic capacitance technology. The input part 20 is also formed integrally with the display part 21. In such a case, the input part 20 may detect coordinates on the display part 21. In addition, if the touch panel tracks multi-touch input, for example, multiple coordinates and pressures may be detected. If the input part 20 is formed based on electrostatic capacitance technology, the input part 20 may detect, for example, a finger action of the user even if the user is at a position which is apart from the input part 20 by a specified distance. The input part 20 may acquire a gesture instruction as a movement of the user's finger movement or the like.

The user's instruction inputted via the input part 20 include, for example, instructions for installing and calling each of a panel application 520 (FIG. 2), a standard application 120, and the expanded application 400. Furthermore, it is possible to input or change information of each user according to his/her instruction.

The display part 21 is configured by a flat display panel such as an LCD (Liquid Crystal Display), an OEL (Organic Electro-Luminescence), an FED (field Emission Display), or the like, a projector, an LED for status display, or the like.

If the input part 20 is formed integrally with the display part 21, the display part 21 may display the buttons of the preceding input part 20 as so-called "software buttons".

The display part 21 displays various screens that are drawn by a GUI based specific browser. The display part 21 is also capable of displaying, for example, an image that is stored in the storage part 19 (reference to FIG. 2).

The FAX transceiving unit 18 is configured by a FAX board or the like which perform facsimile transmission/reception.

The FAX transceiving unit 18 performs facsimile transmission by drawing an image based on the image data read by the document reading unit 12, a file received by the network transceiving unit 15, or the like. The FAX transceiving unit 18 provides an image formation on the facsimile received image data that is stored in the storage unit 19 for transmission to the external terminal device from the network transceiving unit 15.

The storage unit 19 includes storage medium such as semiconductor memories such as a ROM (Read Only memory), a RAM (Random Access Memory), a flash memory and the like, and a HDD (Hard Disk Drive) and the like, controllers thereof, and the like.

In the ROM, the flash memory, and the HDD of the storage unit 19, there are stored control programs and data which for operation control of the image formation device 1. These control programs and data may be provided in the form of firmware. These control programs and data are developed on the RAM or the like when executed and are executed by the control unit 10.

The storage unit 19 may also store various job data, the image data scanned by the document reading unit 12, the image processed image data by the image forming unit 11, files that include, for example, a print document transmitted another terminal device (not shown), various files that is read from connected storage medium, thumbnail image data, or the like.

The storage unit 19 may store user's account settings. Further, the storage unit 19 may include document box area for each user.

It is to be noted that in image formation device 1 the control unit 10 and the image forming unit 11 may be formed integrally similar to a CPU or the like which has a built-in GPU and a chip-on-module package.

The control unit 10 and the image forming unit 11 may also be provided with a built-in RAM, ROM, flash memory or the like.

[Control Configuration of Image Formation Device]

Figure 2:
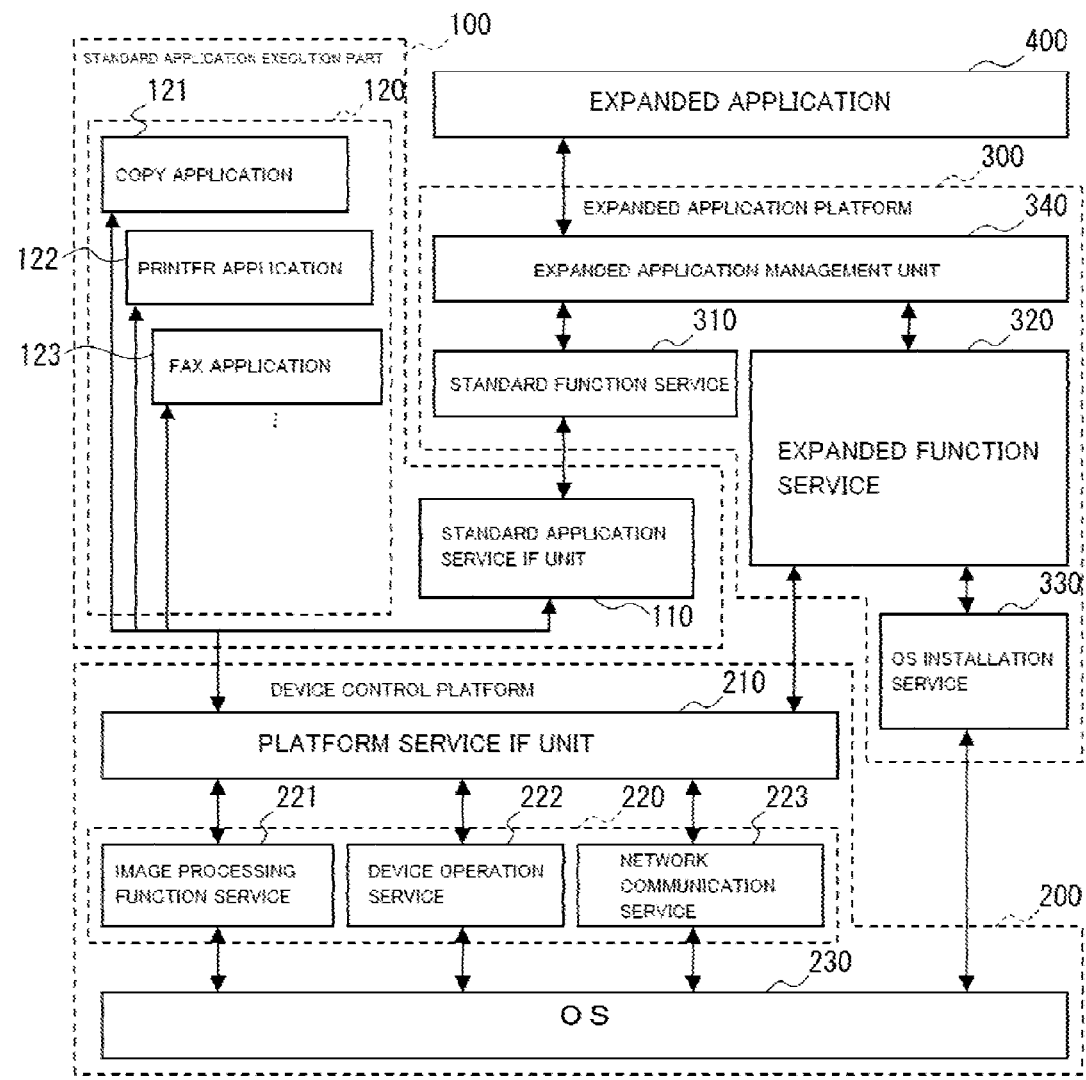
FIG. 2 is a blockdiagram that is illustrative of a control configuration of the image formation device shown in FIG. 1.

Next, with reference to FIG. 2, a description is made as to a control configuration of the image formation device 1.

The image formation device 1, which is designed as a three layered block structure, includes, on a circuit of the control unit 10, a standard application execution part 100 (standard application execution part), a device control platform 200 and an expanded application platform 300 (expanded application platform), and executes the expanded application 400 on the expanded application platform 300. If the control unit 10 executes the control program of the present invention, the standard application execution unit 100, the device control platform 200, and the expanded application platform 300 are realized. Furthermore, the control unit 10 is capable of the expanded application 400, the standard application 120, and an OS 230 based on its control configuration shown in FIG. 2.

The standard application execution unit 100 executes the standard application 120 that utilizes hardware resource under the control of the device control platform 200. The standard application execution unit 100 is provided with the standard application 120 that is installed on the device control platform 200 and a service corresponding to this standard application 120.

The device control platform 200 manages a hardware resource of the whole of the image formation device 1 on the OS 230 (Operating System) and controls each the unit on a function-by-function basis.

The device control platform 200 is a collection of programs and data which acts as an execution infrastructure for running the standard application 120, the programs and data including, for example, an API (Application Programming Interface), a middleware, a run-time engine, a linker, and the like (which are hereinafter referred to as "API and the like"), a service on the OS 230 (Service, Daemon, which are hereinafter referred to as "service and the like"), and an interpreter for translating and running a script language or an intermediate language, a JIT (Just In Time Compiler) and a virtual machine (which are hereinafter referred to as "virtual machine and the like). In addition, the expanded application platform 300 per se runs on the OS 230.

The expanded application platform 300 calls the standard application 120 to utilize its function, calls the device control platform 200 to utilize its hardware resource, and manages and executes the expanded application 400.

The expanded application platform 300 is a collection of programs and data which act as an execution infrastructure for running the expanded application 400, the programs and data including the API and the like, the Service and the like, and the virtual machine and the like. In addition, the expanded application platform 300 per se runs on the OS 230.

The expanded application 400 is a collection of programs and data which are included in an application to perform various processings on the expanded application platform 300.

In more detail, the standard application execution unit 100 includes is provided with the standard application 120 and the standard application service IF unit 110 (standard application service interface unit).

The standard application 120 is programs and data of an application that executes various processings on the device control platform 200.

The standard application 120 acquires a user's instruction and utilizes various functions of the image formation device pursuant to this user's instruction. In addition, the standard application 120 may be described with the intermediate language application such as Java (registered Trademark) or the like, or one of script languages or the like.

The standard application 120 may include, for example, a copy application 121, a printer application 122, a FAX application 123, and the like which are pre-installed at the time of shipping from the factory.

The copy application 121 causes the document reading device 12 to read a document when receives a user's copy instruction from the operation panel unit 16 and causes the image forming unit 17 to form an image. The printer application 122 draws a file or the like of a PDL (Page Description Language) which are received by the network transceiving unit 15 pursuant to an instruction from an external terminal device (not shown) or the like and cause the image forming unit 17 to form an image. The printer application 122 may draw from a file in the document box of the storage unit 19 pursuant to a user's instruction via the operation panel unit 16 and cause the image forming unit 17 to form an image.

The FAX application 123 causes the document reading unit 12 to read a document when receives a user's facsimile transmission instruction from the operation panel unit 16 and cause the FAX transceiving unit 18 to facsimile-transmit the resulting data. The FAX application 123 may draw from a file received from the external terminal device and transmit the resulting image from the FAX transceiving unit 18. The FAX application 123 causes the image forming unit 17 to form an image from a facsimile image data received from the FAX transceiving unit 18. In addition, the FAX application 123 may store the received facsimile image data in the document box of the storage unit 19.

It is to be noted that standard application 120 may be installed after starting the use of the image formation device 1. In other words, for example, a processing such as an installation of the FAX application 123 may be made when the FAX board of the FAX transceiving unit is mounted.

In addition, regardless of the hardware configuration, the user may is allowed to install a user's original standard application 120.

The standard application service IF unit 110 provides an interface which makes it possible to utilize the function of the standard application 120 from an outside of the standard application execution unit 100.

The standard application service IF unit 110 may be provided as a class of JAVA (Registered Trademark) or the like, or an interface, a routine, a function, a header file, an object, a library or the like of Java (Registered Trademark) language. The standard application service IF unit 110 may also be provided as a service or the like on the OS 230. The standard application service IF unit 110 may also provide difference interfaces to each the standard application 120.

In addition, the standard application service IF unit 110 may also be capable of calling the standard application 120 for execution, installation, configuration setting, configuration deletion, or the like.

The device control platform 200 is provided with a platform service IF unit 210 (platform service interface unit), an each unit control service 220, and the OS 230.

The platform service IF unit 210 provides an interface that allows for utilizing the hardware resource from an outside of the device control platform 200.

The platform service IF unit 210 calls the each unit control service 220, enabling utilization of the hardware resource of each unit of the image formation device 1. In addition, the platform service IF unit 210 may be provided, for example, as the API or the like, or the service on the OS 230 or the like. Further, the platform service IF unit 210 may be provided as a C-language structure, a class of C++ language, another object, a routine, a function, a header file, an object, a library or the like (which are hereinafter referred as "class or the like". Moreover, the platform service IF unit 210 may be provided, for example, as an intermediate language of Java (Registered Trademark) or the like.

The each unit control service 220 is provided as a service or the like for controlling each of the units corresponding to each of the functions of the image formation device 1 in a suitable manner.

The each unit control service 220 operates the image processing unit 11, the operation panel unit 16, the network transceiving unit 15 or the like in response to calling from the platform service IF unit 210. The each unit control service 220 may also be capable of calling, for example, a copy function, a network scanning function, and a document box function.

In addition, in the each unit control service 220, its firmware may include a combination of different services, the API or the like, and the class or the like for each production line.

The each unit control service 220 includes an image processing function service 221, a device operation service 222, and a network communication service 223.

The image processing service 221 provides services related to a creation, a conversion, an output of data to be image processed. The image processing service 221, for example, causes the storage unit 19 to store image data of a document that is read by the document reading unit 12 at which resolution, color, and other factors are set and cause the image processing unit 11 to bring the image data or document data (not shown) in the storage unit 19 into an image processing procedure. In addition, the image processing service 221 draws the image data of the image formation at the image forming unit 17 from a file or the like.

The device operation service 222 provides a service for controlling a device of each of the units. The device operation service 222, for example, causes the storage unit 19 to store image data that is obtained from the document reading unit 12, draw an image on a browser that is displayed on the display part 21 of the operation panel unit 16, transmit the drawn image data to the image forming unit 17 for image formation, and cause the FAX transceiving unit 18 to transmit the image data stored in the storage unit 19.

In addition, the device operation service 222 may be capable of, for example, calling functions, the functions including stapling, bookbinding or the like if the image formation device 1 is equipped with option equipment such as a finishing apparatus, user authentication by a user authentication unit using biometrics or IC card, if such a user authentication unit is provided, and acquiring camera image or detecting the line of sight if a camera is provided. Further, the device operation service 222 may be configure to carry out a control such as driving one of motors of the conveying unit which is closer to the control performed by the hardware configuration. Moreover, the device operation service 222 may conduct a process, for example, acquiring a condition of each of the units.

The network communication service 223 provides services related to a network transmission and reception, and the like. The network communication service 223, for example, makes a transmission/reception between the network transceiving unit 15 (FIG. 1) and each of other image formation equipment (not shown), a server, and the terminal device, using various protocols, such as TCP/IP and UDP. For example, the network communication service 223 may be also capable of transceiving the scanned image data, the file in the document box, and the like. It is also to be noted that the network communication service 223 may be capable of causing the FAX transceiving unit 18 to transceive the image data, transceiving the user authentication result on the assumption of the existence of an authentication unit, and transceiving the video image the assumption of the existence of a camera. Moreover, the network communication service 223 is capable of transceiving the condition of each of the units of the image formation device 1, the result of calling the function of each of the units, and the like.

The OS 230 controls each of the units of the image formation device 1. As the OS 230, a general-purpose OS such as Linux (Registered Trademark) or the like, an OS for Embedding, a Real-time OS, and the like are available. In addition, a scheduler of the OS 230 such as a kernel, core, or the like, and programs and data which are for managing the basic hardware may be included in the firmware. Further, the OS 230 may be added on a separate control program such as a device driver, a script, or the like. This device driver may be described with C language, C++ language, Assembler language, or the like which performance oriented languages.

The expanded application plate form 300 is provided with a standard function service 310, an expanded function service 320, and OS install service 330 (operating system install service), and an expanded application management unit 340 (expanded application management unit).

The standard function service 310 is a service or the like which allow to utilize the function of the standard application 120 corresponding to the standard application service IF unit 110.

The standard function service 310 receives a calling from the expanded application 400 which designates each of the functions of each of the standard applications 120 and transmits the resulting function of the standard application to the standard application service IF unit 110 for execution thereof.

The expanded function service 320 is a service or the like which allow to utilize the hardware resource corresponding to the platform service IF unit 210.

The expanded function service 320 receives a calling from the expanded application 400 which designates each of the functions of each of the units of the image formation device 1 and transmits the resulting function of the each of the units to the platform service IF unit 210 for execution thereof.

The expanded application management unit 340 manages and executes the expanded application 400 that is capable of calling the standard function service 300 and the expanded function service 320.

The expanded application management unit 340 causes the API of the expanded application platform 300 to manage, for example, an installation, an activation, an execution, a job termination, and an uninstallation of the expanded application 400, the activation of the expanded application 400 being an availability thereof from the image formation device 1 (hereinafter, these processes are referred collectively to as "life cycle management" of the expanded application 400).

In addition, the expanded application management unit 340 may activate, when acquires the authentication information from the operation panel unit 16 or the like, the expanded application 400 for making the same available.

The OS install service 330 is a service and the like which add a function on the OS 230.

The OS install service 330 installs control programs such as a device driver, a script and the like on the OS 230. In this case, the OS install service 330 may make a change by addition instead of changing the firmware stored in the ROM, the flash memory, or the like. Then, the OS install service 330 may be capable of changing the contents of the setting file of the OS 230. For this reason, the OS install service 330 is allowed to, for example, create, change, delete the file stored in a directory such as "var" or the like, and to change a data base such as registry or the like.

It is to be noted that it is possible for the OS install service 330 change or update part or all of the firmware.

The expanded application 400 is a collection of an application program to be executed on the expanded application platform 300 and data. The expanded application 400 is capable of performing processings that includes, for example, a utilization of the function of the standard application 120 by calling the standard function service 310, a utilization of the function of each of the units of the image formation device 1 by calling the expanded function service 320, or an installation of an additional function on the OS 230 by calling the OS install service 330. For this reason, it is possible to causes various processings to execute which the image formation device 1 solely fails to use.

In addition, the expanded application 400 may include an execution file that runs on the expanded application platform 300 and various data containing class information. In this case, the execution file of the expanded application 400 may be, for example, a file of one of various script language, a file of the intermediate language of Java (Registered Trademark), or a binary file of an application such as execute file of "native". The expanded application 400 may be described with the file of script language or the file of intermediate language when less resource limitations that include, for example, processing speed and required memory capacity. In the expanded application 400 may be described with C language, C++ language, assembler language or the like which are excellent in performance if there is a resource limitation. The expanded application 400 may include required data in addition to the preceding items.

The expanded application 400 includes a practical application such as an OCR (Optical Character Recognition), a monitoring camera application, a watermark creation, billing, employee roster management, document management, contact management, business card management, PDF creation, book managements, group management, or the like. In addition, the expanded application 400 may be an installation application that is designed to add and change a device driver or firmware on the OS 230, or another management application.

Further, a plurality of the expanded applications 400 may be provided. Furthermore, the expanded application 400 may be installed from the image formation device 1 or another terminal device (not shown) to store in the storage part 19. Still further, the expanded application 400 may be stored in an external storage medium. Moreover, the expanded application 400 may select whether or not the expanded application 400 can be executed in correspondence to the information proper to the type of the image formation device 1. Moreover, when each of the expanded applications 400 is installed or executed, it may be possible to make the "activation" essential which causes each of the expanded applications 400 to associate with the image formation device 1 for being executable. It is to be noted that different expanded applications 400 may be installed on different types of the image formation device 1.

It is to be noted that the control unit 10 reads the control programs store in the HDD and flash memory of the storage unit 19 on the RAM or the like to execute, which makes it possible to realize the each of the units shown in FIG. 2.

In addition, each of the units shown in FIG. 2 is capable of accessing each of the units of the hardware resource shown in FIG. 1 for controlling each of the units, performing of reading/writing various data, making a transceiving.

[Expanded Application Execution Processing by Image Formation Device 1]

Next, with reference to FIG. 3 through FIG. 6, a description is made as to an expanded application execution processing performed by the image formation device 1 according to an exemplary embodiment of the present invention.

The expanded application execution processing of the present exemplary embodiment executes the expanded application 400 to perform a processing corresponding to the called standard application 120 and the functions of the hardware resource. In addition, the expanded application execution processing, for example, installs the device driver on the OS 230.

The expanded application execution processing according to the present exemplary embodiment is mainly to cause the control unit 10 of the image formation device 1 to execute, in collaboration with each of the units, the program stored in the storage unit 19, using the hardware resource.

Figure 3:
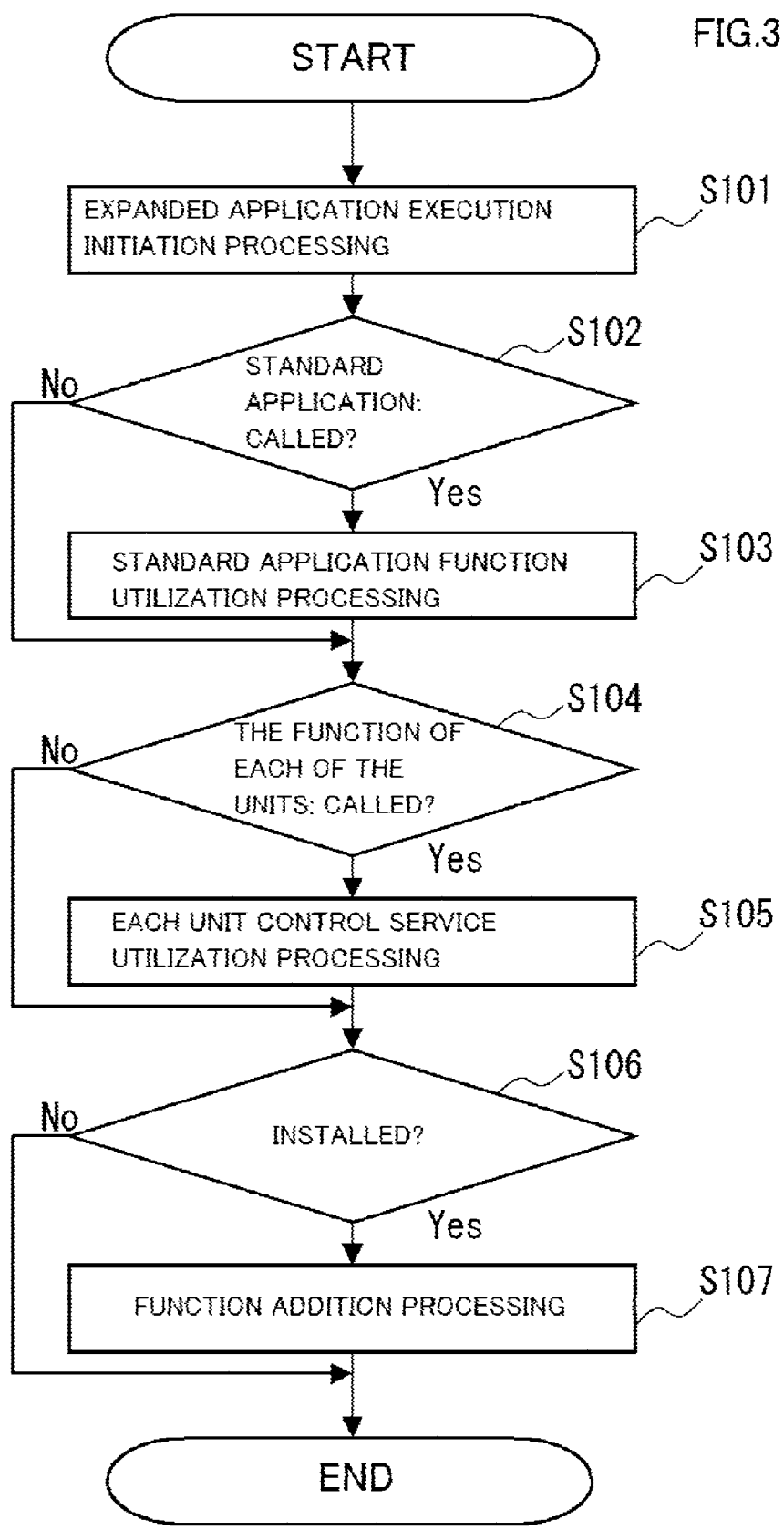
FIG. 3 is a flowchart that is illustrative of an expanded application execution processing according to the present exemplary embodiment.

Hereinbelow, with reference to the flowchart depicted in FIG. 3, the expanded application execution processing is detailed step by step.

(Step S101)

First of all, the expanded application management unit 340 performs an expanded application execution initiation processing.

When the expanded application 400 is installed from the connected storage medium, the server or the terminal device or the like which are not illustrated, the expanded application management unit 340 initiates to execute this expanded application 400 when an execution instruction is issued from the user.

It is to be noted that the expanded application management unit 340 may allow for this execution without such an installation due to the installer application of the device driver.

(Step S102)

At this stage, the standard function service 310 determines whether or not the standard application 120 is to be called. The standard function service 310 provides a determination of YES if the expanded application 400 calls the standard application 120 for utilizing the function thereof and otherwise provides a determination of NO.

If the determination is YES, the standard function service 310 causes the processing to go to STEP S103.

If the determination is No, the standard function service 310 causes the processing to go to STEP S104.

(Step S103)

When calling the standard application 120, the standard function service 310 and the standard application service IF unit 110 performs a standard application function utilization processing.

Figure 4:
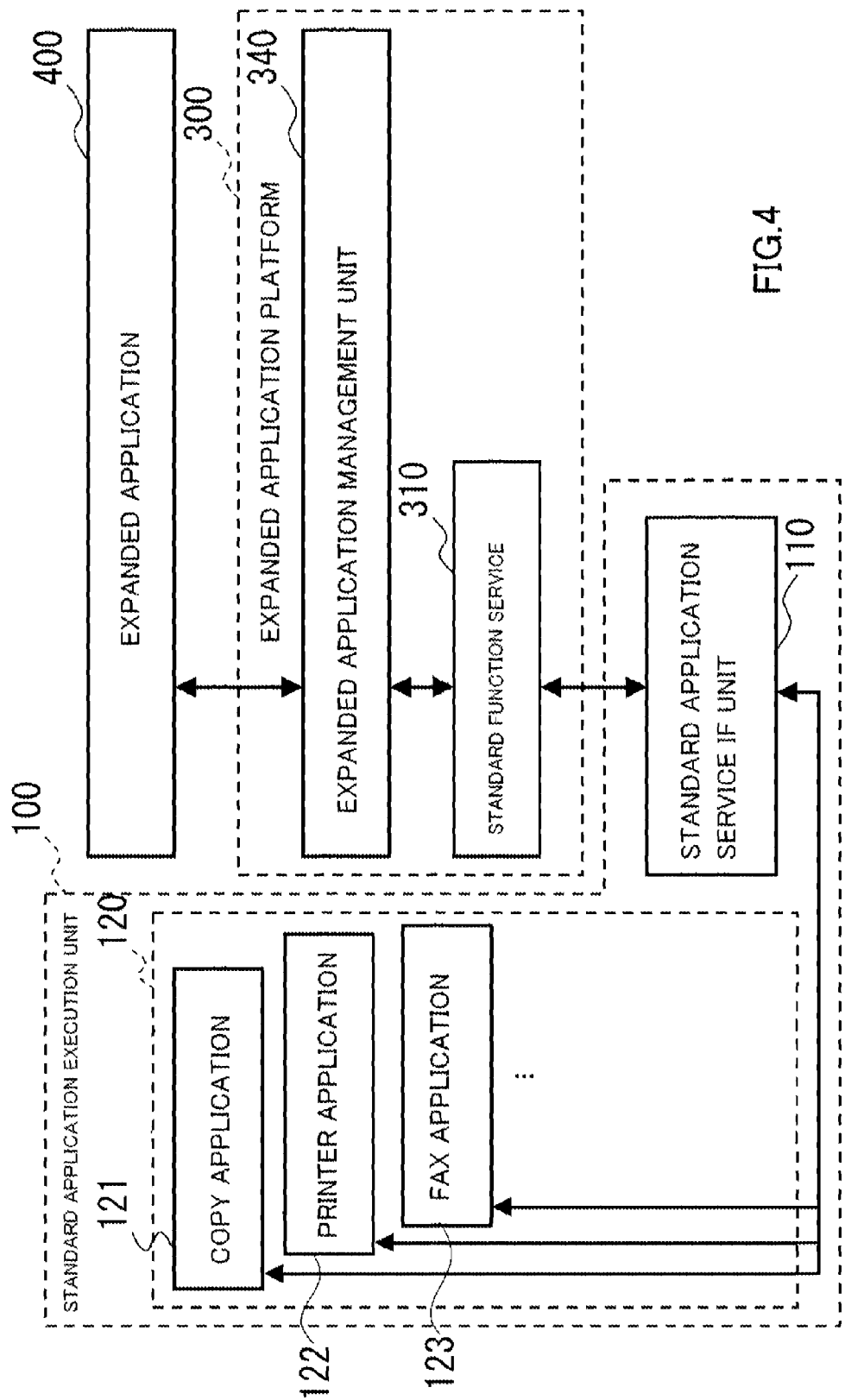
FIG. 4 is a conceptual illustration of a standard application function utilized processing shown in FIG. 3.

According to FIG. 4, the standard function service 310, when the standard function service 310 is called from the expanded application 400 via the expanded application management unit 340, notifies such a calling to the standard application service IF unit 110.

The standard application service IF unit 110 calls the function of the standard application 120 which corresponds to the function that is called from the standard function service 310 of the expanded application platform 300 and executes the function of the standard application 120.

The standard application service IF unit 110, when calls, for example, the copy application 121, may display a copy starting screen on the operation panel unit 16. The standard application service IF unit 110 may call part of the application which includes displaying properties of copy resolutions, colors, or the like for utilizing their functions. In addition, the standard service IF unit 110, when calling the printer application 122, may output various job data, files, or the like which the expanded application 400 acquires or designates. Further, the standard application service IF unit 110, when calling the FAX application 123, may cause the expanded application 400 to acquire a facsimile received image data by designating the same and to transmit a designated file by the expanded application 400 or the like. Further, the standard application service IF unit 110 may installs the standard application 120 from the expanded application 400, to delete the same, and to change the settings of the same.

(Step 104)

At this stage, the expanded function service 320 determines whether or not the function of each of the units of the image formation device 1 is to be called. The expanded function service 320 provides a determination of YES if the expanded application 400 calls the each of the units for utilizing the hardware resource of the image formation device 1 and otherwise provides a determination of NO.

If the determination is YES, the expanded function service 320 causes the processing to go to STEP S105.

If the determination is NO, the expanded function service 320 causes the processing to go to STEP S104.

(Step S105)

When calling the function of each of the units, the expanded function service 320 and the platform service IF unit 210 performs an each unit control service utilization processing.

Figure 5:
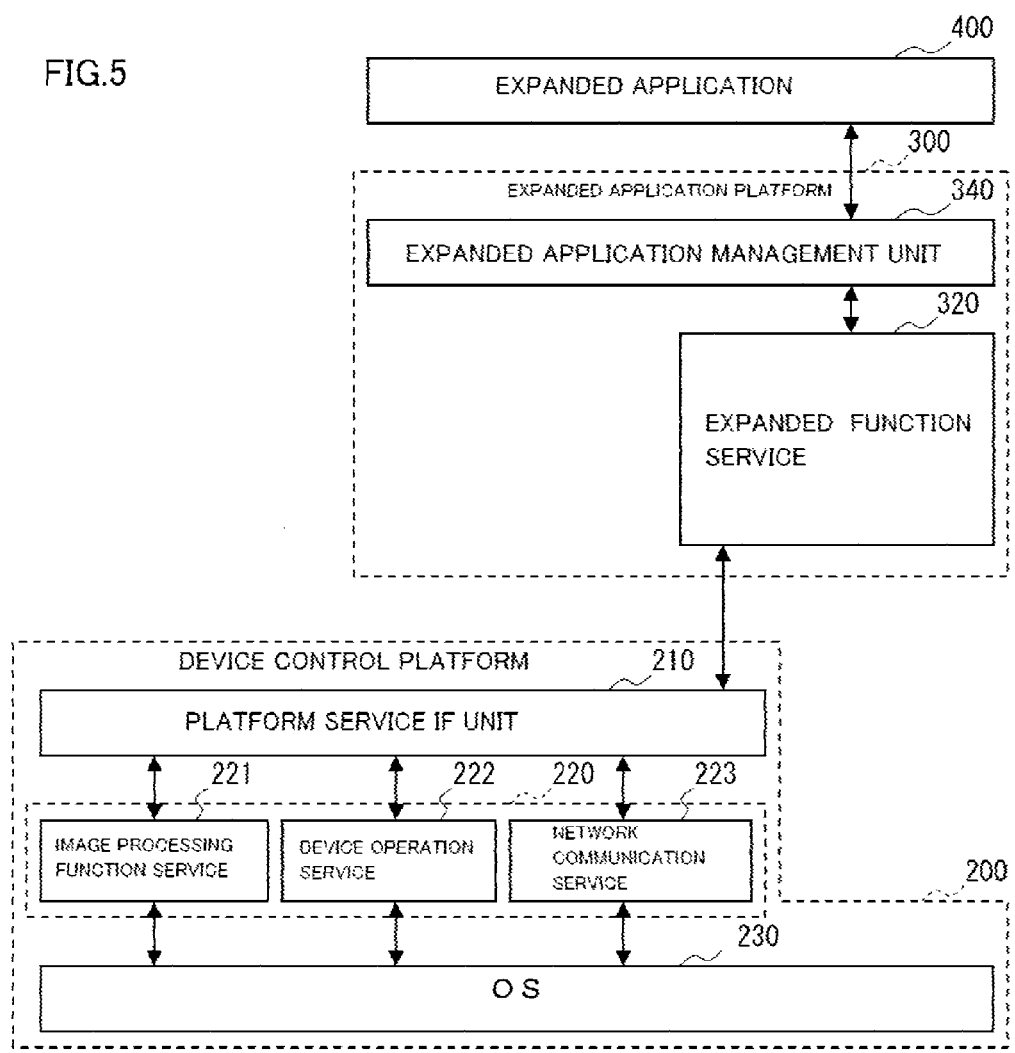
FIG. 5 is a conceptual illustration of each unit control service utilization processing shown in FIG. 3.

According to FIG. 5, the expanded function service 320, when the expanded application 400 calls the expanded function service 320 via expanded application management unit 340 notifies this to the platform service IF unit 210.

The platform service IF unit 210, when being called from the expanded function service 320 of the expanded application platform 300, calls each of the functions of the each unit control service 220 which corresponds to the called function for allowing to utilize the hardware resource of the image formation device 1.

The platform service IF unit 210, for example, when calling a function corresponding to the image processing function service, acquires image data or the like from the expanded application 400, or reads the document from the document reading unit 12 and stores the same as image data, or reads the image data from the storage part 19 and execute a function of the image processing after identifying this function. In this case, the platform service IF unit 210, for example, when calling a function corresponding to the image processing service 221, causes the image processing service 221 to execute processings that include, for example, an enlargement, reduction, rotation, color conversion, noise reduction, format conversion, character recognition, watermark recognition of the image data. In addition, the platform service IF unit 210, for example, when calling a function corresponding to the device operation service 222, causes the device operation service 222 to perform processings that includes, for example, drawing to the operation panel unit 16, controlling the FAX transceiving unit 18, user authentication, driving the conveyer unit 14, and acquiring status of each of the units. Moreover, the platform service IF unit 210, when calling a function corresponding to the network communication service 223, causes the network communication service 223 to execute, for example, transceiving of file, which uses various protocols, streaming, and transceiving of authentication data via the network transceiving unit 15.

(Step S106)

At this stage, the OS install service 330 determines whether or not the device driver is to be installed.

A determination of YES is indicated if the OS install service 330 installs the device driver or the like on the OS 230 and otherwise a determination of NO is indicated.

If the determination is YES, the OS install service 330 causes the processing to go to STEP S107.

If the determination is NO, the OS install service 330 determines the expanded application execution processing.

The OS install service 330, when installing the device driver or the like, executes a function addition processing.

Figure 6:
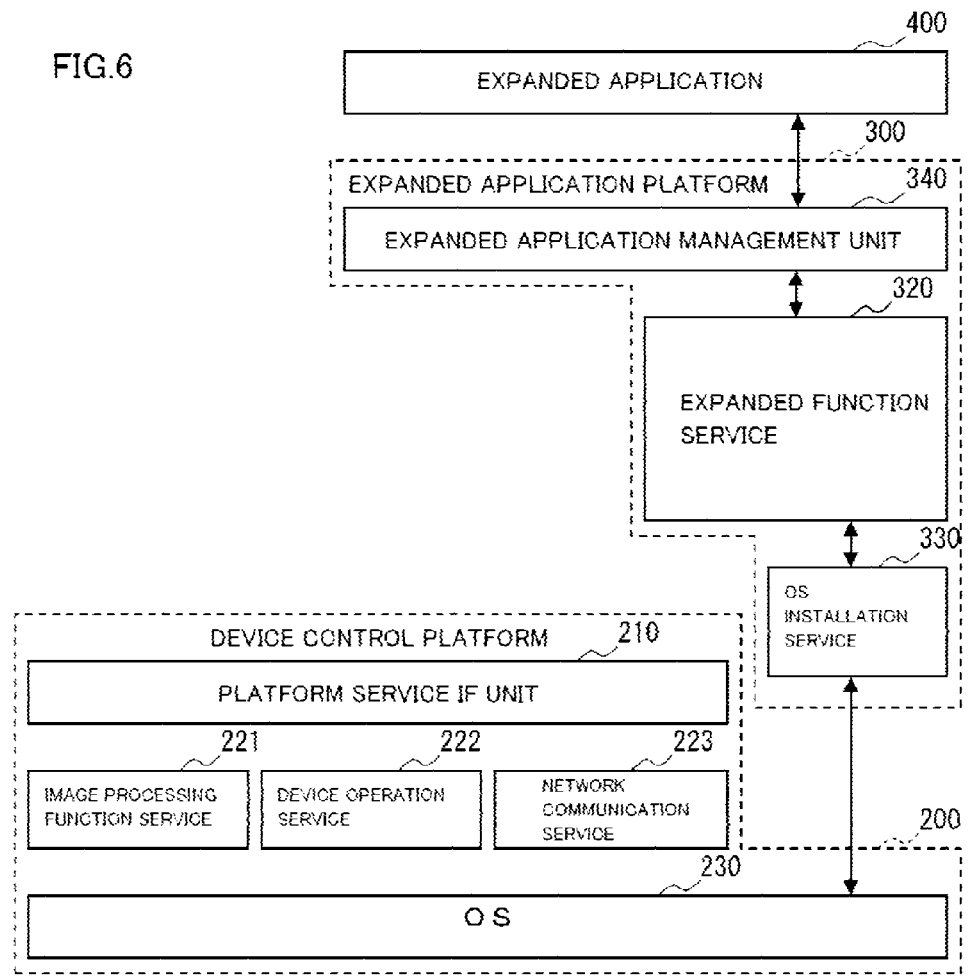
FIG. 6 is a conceptual illustration of a function addition processing shown in FIG. 3.

According to FIG. 6, the OS install service 330, when installing the device driver or the like, causes the storage unit 19 to store the device driver which is acquired from the extended application 400 via the extended application management unit 340 and the extended function service 320. Thereafter, the OS install service 330 changes the settings of the OS 230. Thereby, the OS 230 can be added thereon with a function.

It is to be noted that the OS install service 330 may rewrite the firmware. In this case, the OS install service 330 writes the firmware on the flash memory or the HDD which is acquired from the extended application 400 in a manner similar to acquiring the foregoing device driver.

In such a way, the extended application execution processing according to the present exemplary embodiment terminates.

With the foregoing configuration, the following effects are obtained.

Recently, due to the development of utilizing mobile terminals in business which include, for example, smartphones and tablets, and wide spreads of cloud services and social networking services (SNS) etc., the IT infrastructure per se is made changed drastically, which requires to cope with speed evolution of IT technology.

However, it is not easy for the commonly used platform described in Patent Literature 1 to customize and expand the same, which makes the development costly.

To the contrary, the image formation device 1 is featured to include the device control platform 200 that manages the hardware resource on the OS 230, the standard application execution unit 100 that executes a standard application 120 that utilizes the hardware resource that is under the management of the device control platform 200, and the expanded application platform 300 that includes the standard function service 310 allowing the standard application 120, which is to be executed by the standard application execution unit 100, to utilize the function corresponding to the standard application service IF unit 110, the expanded function service 320 allowing for a utilization of the function of the hardware resource corresponding to the platform service IF unit 210, and the expanded application management unit 340 managing and executing an expanded application 400 that is capable of calling the standard function service 310 and the expanded function service 320.

With the preceding configuration, the expanded application platform 300 of layered structure allows the extended application 400 to utilize the function of the standard application 120 or the hardware corresponding to each of the units. Thus, it is possible to easily establish a customization to modify the configuration according to customer specification, allowing for providing the image formation device with the reduced production cost.

In brief, the image formation device 1 of the present exemplary embodiment, when being allowed to utilize only the function of the standard application 120, can be quickly developed with using the script language or the like. On the contrary, when a customization is required in which the hardware resource has to be controlled in a direct manner, it is possible to call the function of each of the units without having to access the standard application 120. In such a way, the image formation device 1 of the present exemplary embodiment causes the layered expanded platform 300 to absorb inevitable differences in customization due to various customers' desire. Thereby, it is easy to cope with the level differences between required customizations. In addition, expanding the layered service makes it possibly to clarify the range with which the customization can cope, allowing for an easy development of the expanded application 400. Further, it is not necessary to prepare SDK (Software Development Kit), NDK (native Development Kit), and the like which are different in level.

Furthermore, the image formation device 1 of the present exemplary embodiment is provided with a software architecture in which a platform is layered, which makes it possible to provide the image formation device 1 corresponding to a device that copes with the customer's desired new service with a shortened developing period. In other words, it is possible to provide quickly and inexpensively the image formation device with best performance and function, which the customer's seeking new technology reflects on earlier.

The image formation device 1 according to the present exemplary embodiment has a feature that the expanded application plat form 300 further includes the OS install service 330 that adds a function to the OS 230.

With such a configuration, it is also possible to expand the function on the OS 230 without having to change the firmware, which makes it possible to reduce development costs and the like which are accompanied by the tests for updating the firmware. In addition, it is unnecessary to update the entire firmware whenever the OS 230 is added with a function.

The image formation device 1 according to the present exemplary embodiment also has a feature of further including the standard application service IF unit 110 that provides the interface allowing to utilize the function of the standard application 120 from the outside of the standard application execution unit 100 and the platform service IF unit 210 that provides the interface allowing to utilize the hardware resource from the outside of the device control platform 200.

With this configuration, it is possible for the standard application 120 and the device control platform 200 to provide the interfaces of unified format in an easy way, which makes it possible to easily establish a unified developing environment under which the expanded application 400 is created, whereby the developing costs can be reduced.

Further, the function of the standard application 120 and the hardware resource utilized by the device control platform 200 are made executable independently from the expanded application 400. For this reason, the performances of the expanded application 400 which include, for example, a speed during execution can be increased.

It is to be noted that though the foregoing exemplary embodiment describes one example wherein the standard application 120 or the like is called from the expanded application 400, the expanded application 400 may be called from each of the standard application 120, the each unit control service 220, the OS 230, and the like. In addition, it is possible to for the standard application service IF unit 110 to call functions between the standard applications 120.

The expanded application 400 may also include "general applications" that realizes desired functions by calling each of the functions of the image formation device 1 and a "management application" that manages these general applications.

With this configuration, the expanded application 400 is capable of controlling the image formation device 1 in a flexible manner and concurrently the security may be enhanced.

The foregoing exemplary embodiment also has been described that the standard application 120 and the expanded application 400 are in condition of being already stored in the storage unit 19.

However, it is possible to install the standard application 120 and the expanded application 400 in the storage unit 19 separately from an external storage medium (not shown) connected to the image formation device 1, a storage medium connected to the external server, an external terminal device connected via the network, or the like. In this case, it may be configured that these standard application 120 and the expanded application 400 are available from only the user who made such installations, the image formation device 1, and the terminal device.

With such a configuration, it is possible to realize a function expansion in a flexible manner, which reduces the managing costs.

In addition, it is possible to cause the storage unit 19 to store an application that is different from the standard application and the expanded application 400 in type. For example, it may be possible to cause the storage unit 19 to store a Web application or the like (which are hereinbelow referred to "external application") other than the expanded application 400. The external application may be read into the image formation device 1 for execution pursuant to a calling by a user which is made by an instruction to the operation panel unit 16 of the image formation device 1.

With such a configuration, using the application of the expanded application platform 300 and the external application in a flexible selection manner enhances the usability of users.

Second Exemplary Embodiment

Figure 7:
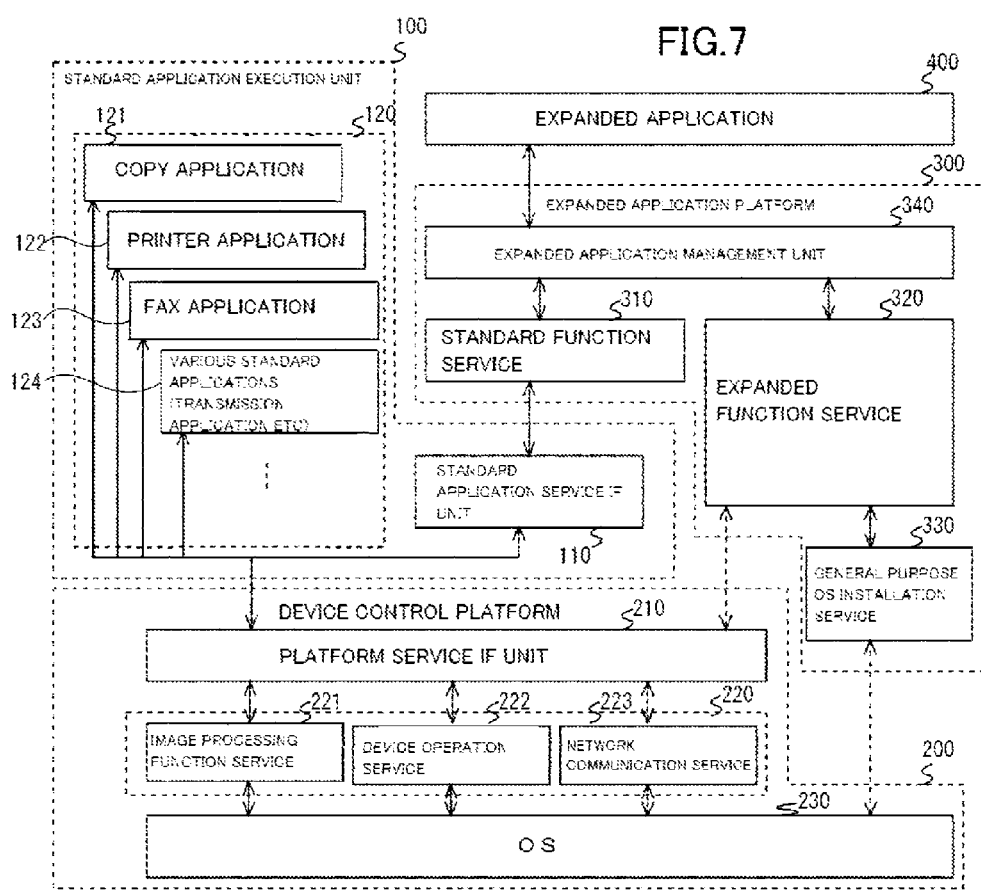
FIG. 7 is a blockdiagram of a control configuration of an image formation device of a second exemplary embodiment.
Figure 8:
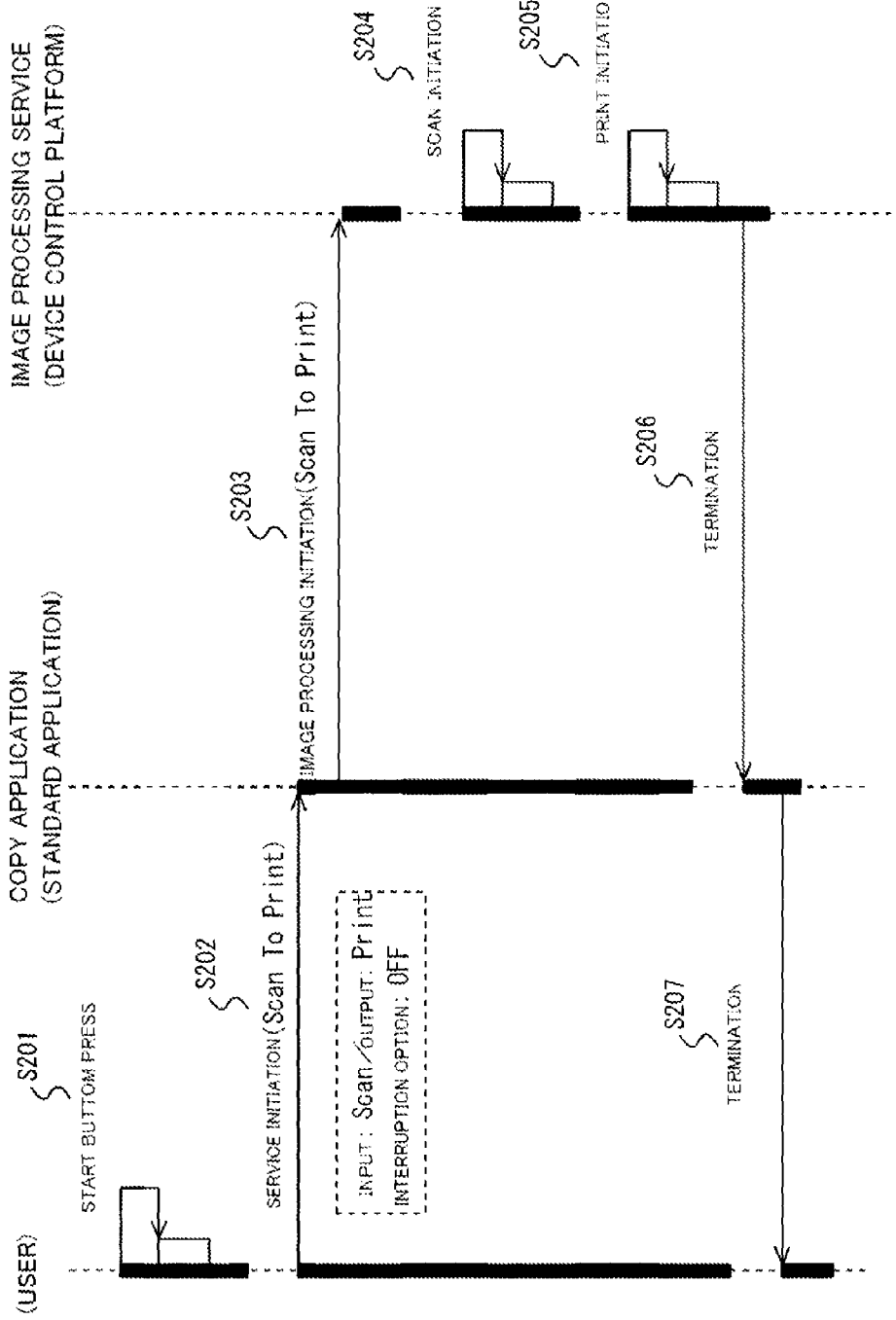
FIG. 8 is an illustration for an image processing by the image formation device shown in FIG. 7, such as an illustration for explaining a standard function of a copy application.
Figure 9:
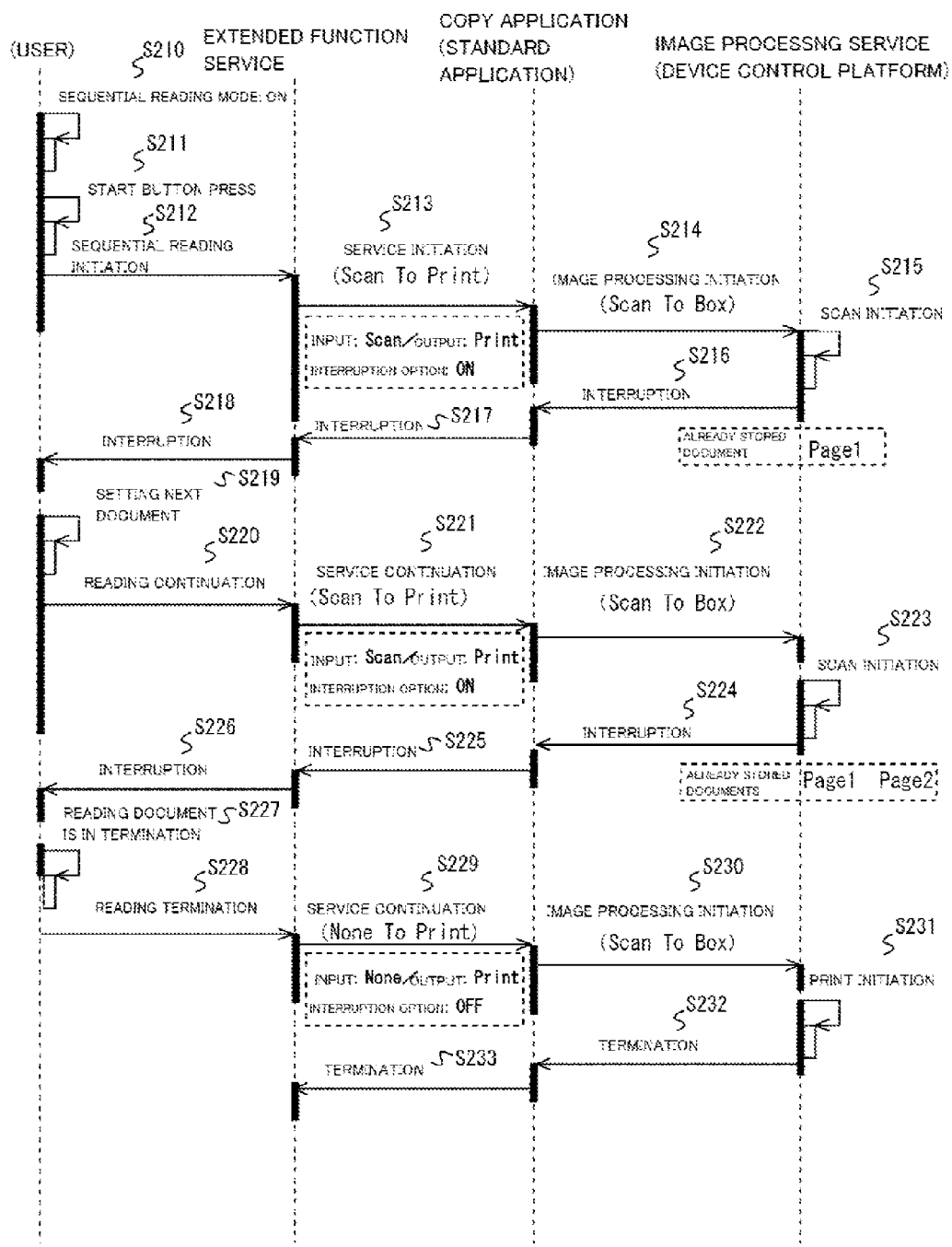
FIG. 9 is an illustration a case in which the standard function of the copy application shown in FIG. 8 is added with (expanded to), for example, a copy function by reading a plurality of added documents.

Next, with reference to FIG. 7 through FIG. 9, a description is made as to an image formation device according to a second exemplary embodiment of the present invention.

At first, with reference to FIG. 7, a control configuration of the image formation device according to the second exemplary embodiment of the present invention is described.

The image formation device of the second exemplary embodiment is similar to the image formation device 1 (FIG. 1) of the first exemplary embodiment in system configuration. In addition, numbers in the image formation device of the second exemplary embodiment being the same with those in the image formation device 1 (FIG. 2) of the first exemplary embodiment indicate the same elements thereof.

According to FIG. 7, in the image formation device of the second exemplary embodiment, various standard applications 124 are already installed in the standard application execution unit 120 when, for example, the image formation device of the second exemplary embodiment is in condition for shipment from the factory.

The various standard applications 124 include a transmission application that is described later. This transmission application is a function expanded application which is detailed later, this transmission application being added with functions that include, for example, printing a reserve print as a copy of a transmitted document.

In the image formation device of the second exemplary embodiment, the copy application 121, the printer application 122, the FAX application 123, the various standard application 124 and the like include the following general purpose interfaces (1) though (5) whose respective availability are made ON/OFF depending on settings made by an expanded function service 320. In addition, the following device means the hardware resource.

(1) The interface, which is provided from the application service side, is configured to be a unit of one device input—multiple device output, but should be made available as multi device input—multi device output by repeating interruption/continuation.

(2) The interface, which is designated with input/output devices upon request from the user side to the service, should allow for editing only the inputted image data if no designation is indicated for input device designation.

(3) The interface shall include an interruption option and is capable of interrupting the service without having to start an output after image inputting.

(4) The interface should include a termination option and is configured such that even if the content of the previous requested service terminates, the termination determination should be under the control of the service user side.

(5) The interface should include an output designation correction option that allows the user side to designate whether or not the system side can automatically correct to another appropriate output designation if an unexpected condition of the system fails to provide an output to the user designated output destination.

It is to be noted the details of the general-purpose interfaces is made later.

In addition, the standard application 120 may be installed after the time of beginning of use of the image formation device according to the second exemplary embodiment. More specifically, it may be possible to perform processings that include, for example, an installation of the FAX application 123 at a time when an FAX board of the FAX transceiving unit is mounted.

Further, it may be possible for the user to install his/her own standard application 120 independently of the hardware configuration.

[Image Processing by Image Formation Device of the Second Exemplary Embodiment]

Next, with reference to FIG. 8 to FIG. 9, an image processing by the image formation device according to the second exemplary embodiment. It is to be noted that hereinafter a description of a processing is made which is performed by, for example, the copy application 121 of the standard application 120 shown in FIG. 7. In addition, a standard function of the copy application shown in FIG. 8, and in FIG. 9, a case is described in which the standard function of the copy application, for example, is added with (expanded to) a copy function of reading plural pieces of document by adding document.

First of all, as shown in FIG. 8, when the user performs a copy setting via the operation panel unit 16 and then presses a start button on the operation panel unit 16 (STEP S201), a service starts (Step S202). The copy setting at this stage is, for example, a selection of copy using the operation panel unit 16 or the like. Here, it is assumed that the general-purpose interface that is to be provided from the copy application 121 is "Scan To Print". More specifically, it is indicate that a Scan input and a Print output.

Next, the interface "Scan To Print" starts the image processing (STEP S203) which is provided when the image processing function service 221 of the each unit control service 220 of the device control platform 200 is processed.

At this time, the document reading unit 12 begins to read (scan) the document (STEP S204). The read image data here is stored in, for example, the document box of the foregoing storage unit 19. The image forming unit 17 forms an image based on the stored image data and prints the same on the recording sheet (printing start) (STEP S205).

When the printing completes, the processing of the image processing function service 221 of the each unit control service 220 terminates (STEP S206) and then the processing of the copy application 121 also terminates (STEP S207).

It is to be noted that the reading (scanning) of document by the document reading unit 12, the image formation by the image forming unit 17 and the like are performed by services provided from the image processing function service 221 of the each unit control service 220 and the device operation service 222.

The foregoing description is the standard function of the copy application 121.

Next, with reference to FIG. 9, a description is as to a case of image processing in which the standard function, for example is added with (extended to) a copy function of reading plural pieces of document by adding document. It is to be noted that the function of this case is added (extended) by that the expanded function service 320 causes the general-purpose interface (1), which is one of the foregoing general-purpose interfaces (1) through (5), to ON for utilization.

At first, as shown in FIG. 9, the user performs the copy setting using the operation panel unit 16. This copy setting is for selecting performing a copy or the like, however includes a selection of utilizing the addition (expansion) of the function as described above.

More specifically, for example, it is assumed that the foregoing addition (expansion) of the function can display, on the operation panel unit 16, a content that allows for a selection of ON/OFF of a sequential reading mode. In this case, a selection of ON of the sequential reading mode allows to establish the sequential reading mode (STEP S210).

Then, setting the document and pressing the start button of the operation panel unit 16 (STEP S211) starts the sequential reading (STEP S212), resulting in a service initiation (STEP S213).

At this stage, the general-purpose interface which the copy application 121 provides shall be the "Scan To Print". More specifically, it is indicate that a Scan input and a Print output. In addition, it is included that an interruption option is made ON, resulting from the addition (expansion) of the function.

Next, the image processing is initiated (STEP S214) by the interface "Scan To Box" that is to be provided together with the processing of the image processing function service 221 of the each unit control service 220 of the device control platform 200. Here, the Box is, for example, the foregoing document box of the storage unit 19.

Then, the document reading unit 12 begins to read (scan) the document (STEP S215). The read image data is, similar to the above, stored in, for example, the document box of the storage unit 19 (stored document page 1).

Here, when the reading of the document by the document reading unit 12 completes, the provision processing of the interface "Scan To Box" is interrupted (STEP S216) which is involved in the with the processing of the image processing function service 221 of the each unit control service 220, and the provision processing of the general-purpose interface that is provided from the copy application 121 is also interrupted (STEP S217, STEP S218).

Subsequently, setting the next document (STEP S219) and pressing the start button of the operation panel unit 16 establish a continual reading (STEP S220) and then a service is initiated (STEP S221).

At this stage, the general-purpose interface that is provided from the copy application 121 is, similar to the above, "Scan To Print". More specifically, it is indicated that a Scan input and a Print output. In addition, it is included that the interruption option is made ON, resulting from the addition (expansion) of the function.

Next, the image processing is initiated (STEP S222) by the interface "Scan To Box" that is to be provided together with the processing of the image processing function service 221 of the each unit control service 220 of the device control platform 200. Here, the Box is, similar to the above, the foregoing document box of the storage unit 19.

Then, the document reading unit 12 begins to read (scan) the document (STEP S223). The read image data is, similar to the above, stored in, for example, the document box of the storage unit 19 (stored document Page 2).

Here, when the reading of the document by the document reading unit 12 completes, the provision processing of the interface "Scan To Box" is interrupted (STEP S216) which is involved in the with the processing of the image processing function service 221 of the each unit control service 220, and the provision processing of the general-purpose interface that is provided from the copy application 121 is also interrupted (STEP S225, STEP S226).

Subsequently, when the reading of the document completes (STEP S227), for example, pressing a reading end button of the operation panel unit 16 (STEP S228) establishes a service continuation (STEP S229). It is to be noted that pressing the reading end button causes the interruption option to change from ON to OFF.

At this stage, the general-purpose interface that is provided from the copy application 121 is "None To Print". More specifically, it is indicated that No input and a Print output. In addition, it is included that the interruption option is made OFF, resulting from the addition (expansion) of the function.

Next, the image processing is initiated (STEP S230) by the interface "Scan To Box" that is to be provided together with the processing of the image processing function service 221 of the each unit control service 220 of the device control platform 200. Here, the Box is, similar to the above, the foregoing document box of the storage unit 19.

Subsequently, the image forming unit 17 performs an image formation based on the image data stored in the document box of the storage unit 19 (stored document Page 1 and Page 2) and further makes a printing on the recording sheet (printing initiation) (STEP S231).

At this stage, when the printing on the recording sheet completes, the provision processing of the interface "Scan To Box" completes (STEP S232) which is involved in the processing of the image processing function service 221 of the each unit control service 220, and the provision processing of the general-purpose interface provided by the copy application 121 is also terminated (STEP S233).

With the foregoing configuration, it is possible to obtain the following effects.

As described above, in order to install the applications to execute, each of the applications have to be developed for utilizing the basis function of the OS mounted on the image formation device.

In addition, developing an application should be done in an effective manner for suppressing the development costs.

Thus, the architecture of the foregoing Patent Literature 1 is configured to be a two layered configuration that is made up of a platform including an application service, a common system service and a general-purpose OS, and an application that utilizes the function provided from this platform side.

With this configuration, it is possible for developing the applications to use the common platform, which is creases the development performance.

However, there is a problem in that the application side fails to provide a function that is in excess of the function which the platform side provides.

To the contrary, the image formation device, the image forming method and the image forming program according to the present exemplary embodiment, the expansion of the function of the standard application can be achieved by the setting from the expanded function service, which makes it possible to expand the function of the standard application without being affected by the function which the platform (device control platform) side provides.

It is to be noted that in the foregoing description, of the general-purpose interfaces (1) through (5) which the copy application 121 provides, the description is made as to one corresponding to the general-purpose interface (1), but is not limited thereto.

More specifically, for example, the general-purpose interface (2) makes it possible to add (expand) the function that is only capable of editing the inputted image. In addition, for example, the general-purpose interface (3) allows for an addition (expansion) of a function that is capable of interrupting the service without having to initiate an output after an input of image. Further, for example, the general-purpose interface (4) allows for an addition (expansion) of a function that is capable of controlling a determination of termination from the user side of the service after termination of the content of the earlier requested service. Moreover, for example, the general-purpose interface (5) allows for an addition (expansion) of a function wherein the system side is capable of establishing automatically a designation of an appropriate output correction to cope with a trouble at an output destination that is designated by the user side.

In addition, arbitrary combinations of the general-purpose interfaces (1) through (5) which the foregoing copy application 121 provides makes it possible to enhance the convenience in utilization of the function of the image formation device of the present exemplary embodiment. It is to be noted that utilizations and arbitrary combinations of the general-purpose interfaces (1) through (5) which the foregoing copy application 121 provides are achieved by updating the expanded function service 320, which makes it possible to add (expand) a function pursuant to a user's desire without having to install the copy application 121 to which a new function is added (expanded).

Furthermore, in addition to the copy application 121 of the standard application 120, the printer application 122 of the standard application 120, the FAX application 123, the various standard applications 124, and the like are, similar to the copy application 121, previously embedded with the foregoing general-purpose interfaces (1) through (5), which makes it possible to add (expand) a function pursuant to a user's desire by updating the expanded function service 320.

In such a way, the present exemplary embodiment is configured such that the device control platform 200 manages the hardware resource on the operating system (OS 230), the standard application execution unit (standard application execution unit 100) causes the standard application (standard application 120) utilizing the hardware resource that is under the management of the device control platform 200, the expanded application management unit (expanded application management unit 340) included in the expanded application platform (expanded application platform 300) manages and executes the standard function service 310 that allows for utilizing the function of the standard application (standard application 120) that is executed by the standard application execution unit (standard application execution unit 100), the expanded function service 320, and the expanded application (expanded application 400) that is capable of calling the standard function service 310 and the expanded function service 320, respectively, the standard application (standard application 120) is provided with a general-purpose interface for utilizing the hardware resource to cope with an expansion of function, and the general-purpose interface is made available by the setting by the expanded function service 320.

Thereby, the setting by the expanded function service 320 is capable of expanding the function of the standard application and therefore the expansion of the function of the standard application can be achieved without being affected by the function which the platform (device control platform) side provides.

The present exemplary embodiment is also configured such that the requirement for adding (expanding) the function of the standard application 120 is only updating the extended function service 320, which makes it possible to cope with the specification of an individual product flexibly and effectively.

The present exemplary embodiment is also provided with the expanded application platform 300 that includes the standard function service 310 that allows for utilizing the function, which corresponds to the standard application service IF unit 110, of the standard application 120 that is executed by the standard application execution unit 100, the expanded function service 320 allowing for a utilization of the hardware resource corresponding to the platform IF service IF unit 210, and the expanded application management unit 340 managing and executing 400 that is capable of calling the standard function service 310 and the expanded function service 320.

Thereby, it is possible to utilize, from the expanded application 400, the function of the standard application 120 or the hardware resource corresponding to each of the units, which allow the customization that changes the configuration to suit the needs of the customer in an easy way together with reducing the development costs.

In brief, the image formation device of the present exemplary embodiment, when utilizing only the function of the standard application 120, can be developed quickly using a script language or the like. On the other hand, when a customization is required for a direct control of the hardware resource, it is possible to call the function of each of the units without accessing the standard application 120.

The present exemplary embodiment is provided with the standard application IF service unit 110 that provides the interface allowing for utilizing the function of the standard application 120 from the outside of the standard application execution unit 100. Thereby, it is possible to achieve an easy provision of the interfaces of standardized format within the device control platform 200, which reduces the development costs.

In addition, it is possible to access the hardware resource that is utilized by the device control platform 200 in an easy way from the expanded standard application 400. For this reason, it is possible to improve performances that include, for example, the execution speed of the expanded application 400.

It is to be noted that storage unit 19 of the image formation device of the present exemplary embodiment is allowed to store therein different applications in type from the standard application 120 and the expanded application 400. For example, it may be possible to cause the storage unit 19 to store, other than the expanded application 400, a Web application or the like (which are hereinafter referred to as "external application") and user's data or the like. The external application may be called by a user's instruction using the operation panel unit 16 of the image formation device of the present exemplary embodiment to read the external application in the image formation device for execution.

With this configuration, it is possible to determine, in a flexible manner, whether to be used is the application of the expanded application platform 300 or the standard application 120, which enhancing the user convenience in a better way.

Further, the present exemplary embodiment is described such that the present invention is applied to the image formation device, but is not limited, and is applicable to various information processing devices. More specifically, a configuration is available that uses a server that is separately connected, via an USB or the like, to a network scanner or a scanner. Moreover, applicable information devices include, for example, PCs, smart phones, cellar phones, office equipment, and industrial equipment, in which an application can be installed.

Third Exemplary Embodiment

Next, with reference to FIG. 10 through FIG. 13, a description is made as to an image formation device according to a third exemplary embodiment of the present invention.

The image formation device of the third exemplary embodiment is similar to the image formation device 1 (FIG. 1) of the first exemplary embodiment in system configuration and function configuration.

[Detailed Configurations of Platform Service if Unit 210 & Each Unit Control Service 220]

Figure 10:
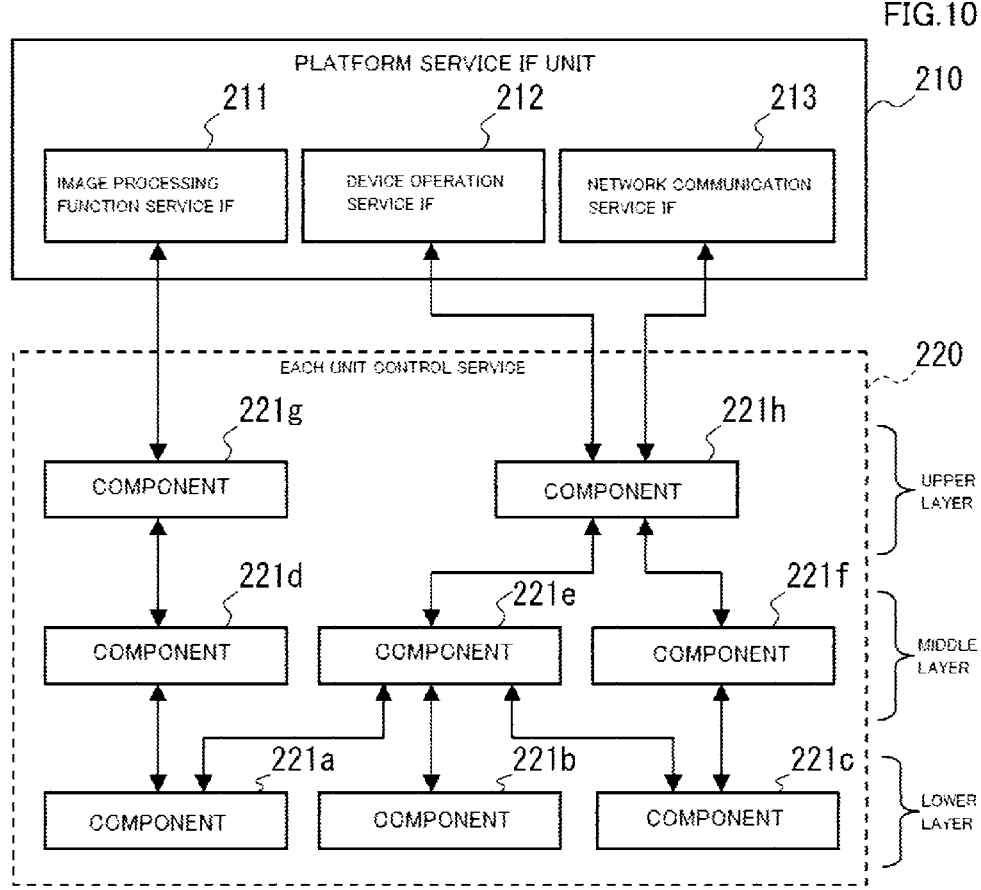
FIG. 10 is a blockdiagram that is illustrative of detailed configuration of platform service IF unit and a service for each unit control according to a third exemplary embodiment.

With reference to FIG. 10, detailed configurations of platform service IF unit 210 and an each unit control service 220 are described.

The platform service IF unit 210 causes the each unit control service 220 to call each of units of the image formation device of the third exemplary embodiment to utilize their hardware resources. For this reason, the platform service IF unit 210 is respectively provided with interfaces which correspond to each functions which the expanded function service 320 can utilize.

In more detail, the platform service IF unit 210 includes an image processing function service IF 211, a device operation service IF 212, and a network communication service IF 213 as the interfaces which correspond to functions which the expanded function service 320 can utilize.

The image processing service IF 211 is the interface that corresponds to the functions of the device control platform 200 which are related to the creation, conversion, and output of data of an image processing.

The device operation service IF 212 is the interface that corresponds to the function of the device control platform 200 that controls a device of each of the units.

The network communication service IF 213 is the interface that corresponds to the functions of the device control platform 200 which are related to network transmission/reception.

The each unit control service 220 is configured as a service that is a combination of components 221 that include a common interface corresponding to the function of each of the hardware resources that are to be utilized via the platform service IF unit 210.

The components 221 include, for example, API or the like and Class or the like of program components and data, and are connected with each other by an interface such as a common calling protocol or the like for enabling data transmission/reception. Each of the components 221 is described by a low-level language such as an assembler language or the like and otherwise a high-level language such as a script language or the like in correspondence with a performance required for utilizing the function of the hardware resource. In addition, the components 221 may be configured such that the components 221 are arranged to correspond to plural layers and are connected between layers. FIG. 10 illustrates an example in which component 221a through component 221h are so arranged as to correspond to an upper layer, a middle layer, and a lower layer (When one of them is indicated, it is merely referred to as "component 221"). The components 221, when are brought into an interlayer connection, data conversion may be available by an interface that is common for layers. In addition, the component 221 may make a data conversion, respectively, for the interface corresponding function to be utilized via the platform service IF unit 210. In the example shown in FIG. 10, the component 221g and the component 221h both of which are on the upper layer make data conversions, using the common interface, in correspondence to the image processing function service IF 211, the device operation service IF 212, and the network communication service IF 213 of the platform IF service unit 210.

Further, in the example shown in FIG. 10, the each unit control service 220 may function as an image processing function service corresponding to the image processing function service IF 211 of the platform service IF unit 210, a device operation service corresponding to the device operation service IF 212, and a network communication service corresponding to the network communication service IF 213.

In more detail, the image forming processing function service provides services related to creation, conversion, and output of the image processing data. The image forming processing function service, for example, causes the storage unit 19 to store image data that is a result of reading a document by the document reading unit 12 that is set in resolution, color and the like, and cause the image processing unit 11 to perform an image processing of the image data in the storage unit 19 and document data (not shown). The image processing function service draws image data, which is to be undergone an image formation at the image forming unit 17, from the file or the like.

The device operation service provides service or the like for controlling the device of each of the units. The device operation service, for example, causes the storage unit 19 to store the image data that is acquired from the document reading unit 12, draw an image on a browser that is displayed in the display part of the operation panel unit 16, transmit the drawn image data to the image forming unit 17 to form an image, and cause the FAX transceiving unit 18 to transmit the image data stored in the storage unit 19 by facsimile.

The device operation service is also capable of, for example, calling functions, the functions including stapling, bookbinding or the like if the image formation device of the third exemplary embodiment is equipped with option equipment such as a finishing apparatus, user authentication by a user authentication unit using biometrics or IC card, if such a user authentication unit is provided, and acquiring camera image or detecting the line of sight if a camera is provided. Further, the device operation service may be configure to carry out a control such as driving one of motors of the conveying unit which is closer to the control performed by the hardware configuration. Moreover, the device operation service may conduct a process, for example, acquiring a condition of each of the units.

The network communication service provides services related to a network transmission and reception, and the like. The network communication service, for example, makes a transmission/reception between the network transceiving unit 15 (FIG. 1) and each of other image formation equipment (not shown), a server, and the terminal device, using various protocols, such as TCP/IP and UDP. For example, the network communication service may be also capable of transceiving the scanned image data, the file in the document box, and the like. It is also to be noted that the network communication service may be capable of causing the FAX transceiving unit 18 to transceive the image data to be fax transceived, transceiving the user authentication result on the assumption of the existence of an authentication unit, and transceiving the video image on the assumption of the existence of a camera. Moreover, the network communication service is capable of transceiving the condition of each of the units of the image formation device of the third exemplary embodiment, the result of calling the function of each of the units, and the like.

It is to be noted that in the example shown in FIG. 10, each of the component 221 is connected, between the layers, to another component 221, but components 221 may be connected on the same level layer, across a layer, or to form a loop. In addition, in spite of different hardware resources and different versions, components 221 may be provided which include a common interface. Thereby, as described later, it is possible to dynamically select an alternative component 221 that changes the connecting destination in a dynamic manner. Further, it is possible to employ a configuration in which the component 221 on the lower layer that is closer to the hardware is written using the low-level language, while the component 221 on the upper layer is using the high-level language. Moreover, it is also possible to install either one of the components 221 from the expanded application 400 using the expanded function service 320 and install the component 221 when, for example, installing the network board or the like.

It is to be noted that each of the units shown in FIG. 2 and FIG. 10 may be realized by executing the control program stored in the HDD or the flash memory of the storage unit 19 or the like by the control unit 10 which has been read in the RAM or the like.

In addition, each of the units shown in FIG. 2 and FIG. 10 may access the each of the units, as hardware resources, which are shown in FIG. 1 for control, reading and writing of various data, transceiving, or the like.

[Each Unit Function Calling Processing by Image Formation Device of the Third Exemplary Embodiment]

Figure 11:
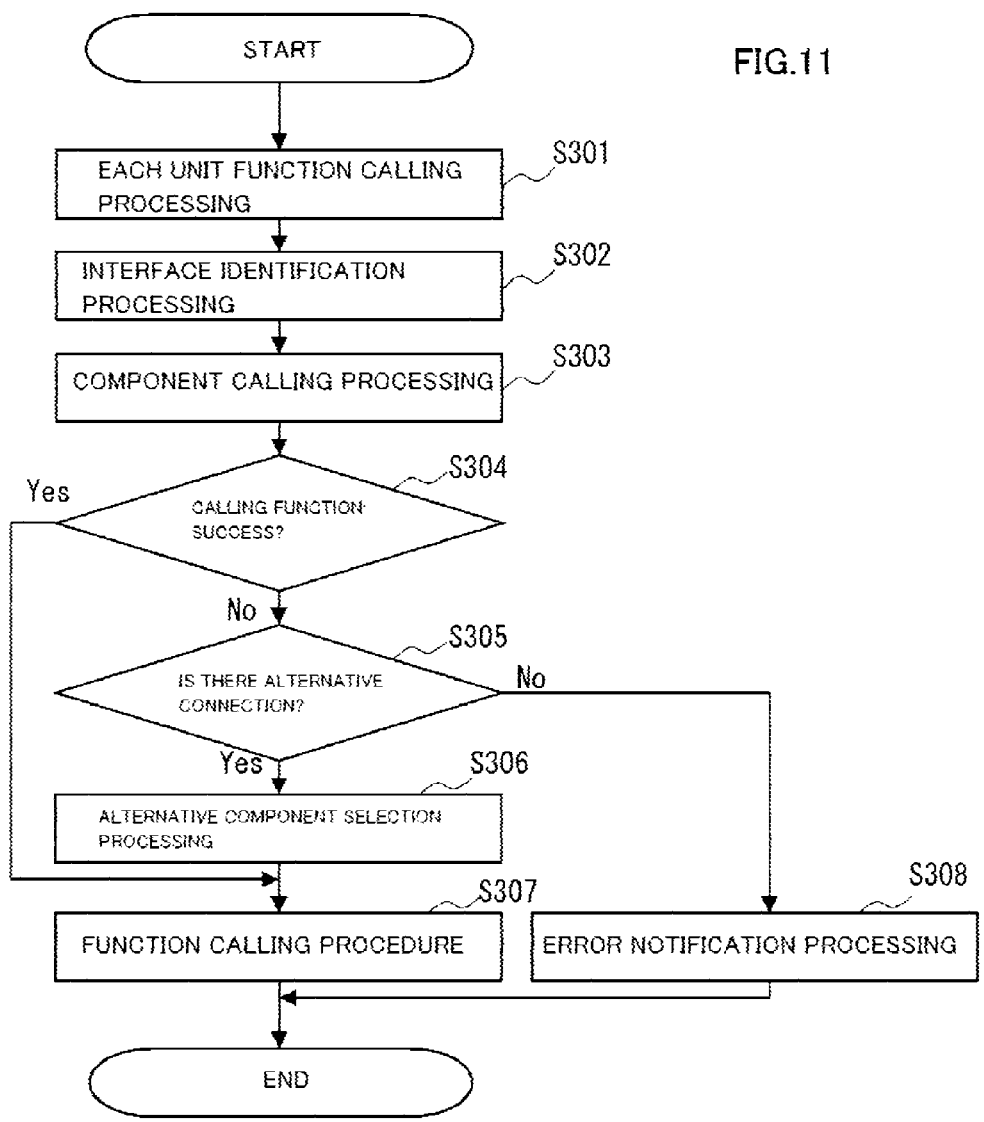
FIG. 11 is a flowchart of an each unit function calling processing according to the third exemplary embodiment.
Figure 12:
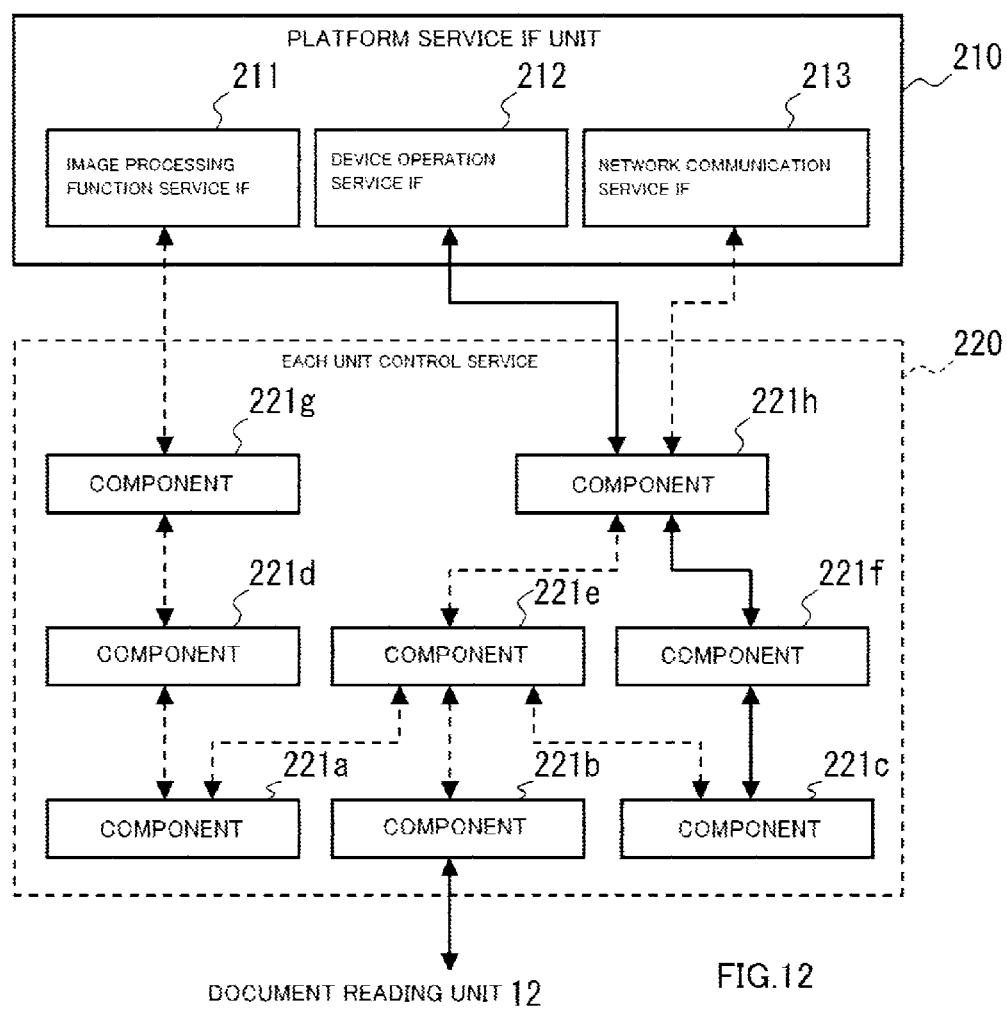
FIG. 12 is a conceptual illustration of a component calling processing shown in FIG. 11.
Figure 13:
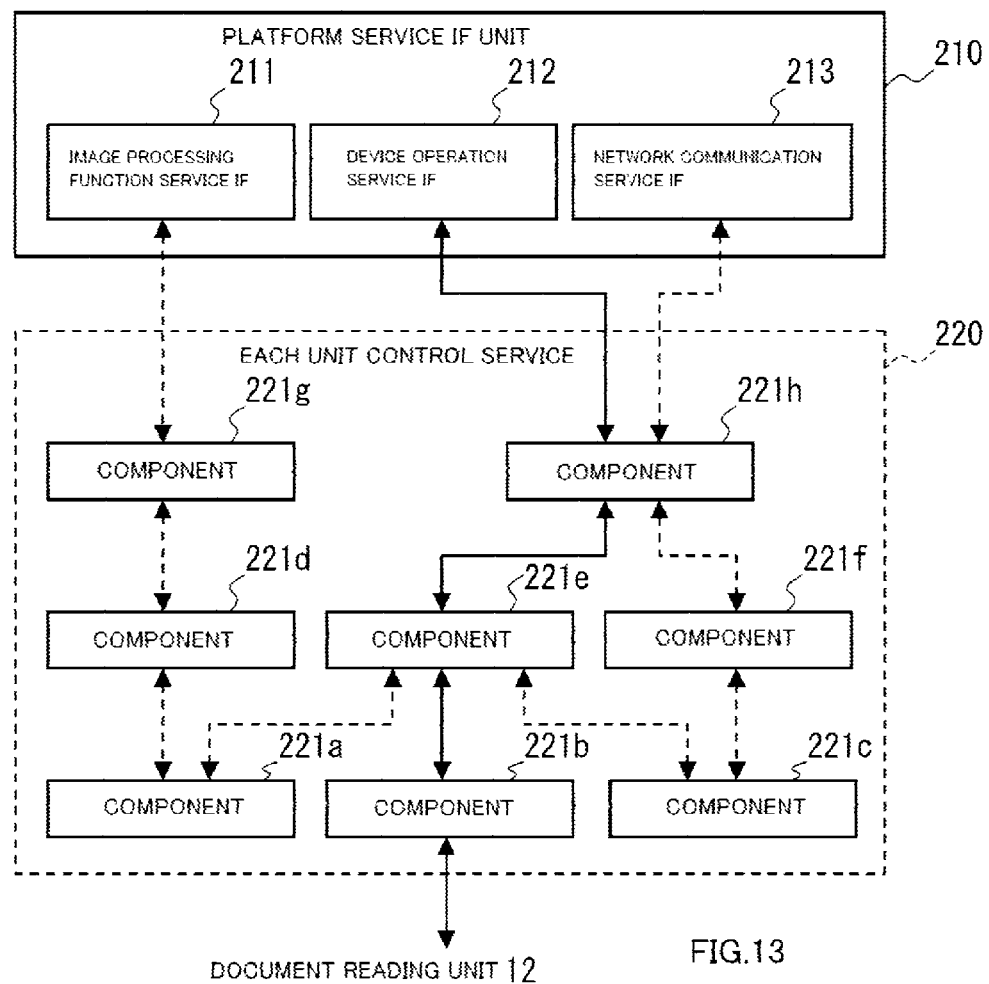
FIG. 13 is a conceptual illustration of an alternative component selecting processing shown in FIG. 11.

Next, with reference to FIG. 11 through FIG. 13, a description is made as to an each unit function calling processing by the image formation device according to the third exemplary embodiment.

In the each function calling processing of the present exemplary embodiment, the hardware resources corresponding to the functions of the image formation device of the third exemplary embodiment are called from the expanded application 400 via the expanded application management unit 340 and the expanded function service 320. At this time, the components 221 of the each unit control service 220 is dynamically configured from the interfaces of the platform service IF unit 210 which correspond to the functions called by the expanded function service 320.

The each function calling processing according to the present exemplary embodiment causes mainly the control unit 10 that is in collaboration with each of the units to control the program store in the storage unit 9 using the hardware resources. Hereinafter, with reference to a flowchart illustrated in FIG. 11, the each unit function calling procedure is detailed in step by step manner.

[Step S301]

At first, the expanded application management unit 340 and the expanded function service 320 begins to call the each function calling.

The expanded application management unit 340 begins to execute the expanded application 400 in response to an instruction of executing from a user after the expanded application 400 has been installed from the connected storage medium, the server, not illustrated, the terminal device, or the like.

The expanded application 400 executed by the expanded application management unit 340 calls the expanded function service 320 via the expanded application management unit 340.

In response to this calling, the expanded function service 320 designates the function for utilizing the hardware resources and notifies the resulting function to the platform service IF unit 210.

(Step S302)

Next, the platform service IF unit 210 performs an interface identification processing.

The platform service IF unit 210 identifies an interface corresponding the function that is designated by the expanded function service 320.

In an example shown in FIG. 12, when the scan function is desired to utilize by accessing the document reading unit 12 as a hardware resource, the platform service IF unit 210 identifies the device operation service IF 212 as the interface.

(Step S303)

Next, the platform service IF unit 210 and the each unit control service 220 perform a component calling processing.

The platform service IF unit 210 calls the each unit control service 220 via the identified interface.

The each unit control service 220 tries to call the function of each of the units of the image formation device of the present exemplary embodiment via the each of the components 221 connected to the called interface.

In the example shown in FIG. 12, in order to utilize the scanning function of the document reading unit 12, at first, trying to access the document reading unit 12 is made from the device operation service IF 212, the component 221*h* connected thereto, the component 221*f* connected thereto, and the component 221*c* connected thereto, in such an order.

(Step S304)

Next, the each unit control service 220 determines whether or not the function calling terminates in success. The each unit control service 220 determines YES if the each unit control service 220 was able to call the function designated by the expanded function service 320 via the component 221 connected to the each unit control service 220. The each unit control service 220 determines NO as a calling function failure if the each unit control service 220 was not able to call the function corresponding to the hardware resource due to an absence of the component 221 corresponding to the function, a failure in connection to each of the units corresponding to the function, or the like. In the example shown in FIG. 12, the component 221*c* is out of connection to the document reading unit 12, which causes the each unit control service 220 to determine NO.

If the determination is YES, the each unit control service 220 causes the processing to go to STEP S307.

If the determination is NO, the each unit control service 220 causes the processing to go to STEP S305.

(Step S305)

If the calling function terminates in failure, the each unit control service 220 determined whether or not there is an alternative connection. The each unit control service 220 searches each of the components 221 connected to the interface of the platform service IF unit 210 and determines YES if the result of this search indicates that there is a component 221 as an alternative connection which is capable of calling the designated function. The each unit control service 220 determines NO if the search fails to detect an alternative connection.

If the determination is YES, the each unit control service 220 causes the processing to go to STEP S306.

If the determination is NO, the each unit control service 220 causes the processing to go to STEP S308.

(Step S306)

If an alternative connection is found, the each unit control service 220 performs an alternative component selection processing.

The each unit control service 220 makes a switching to select the searched each of the components 221. At this time, the each unit control service 220 may cause the storage unit 19 to store this alternative connection route.

According an example shown in FIG. 13, the each unit control service 220 establishes a sequential connection, as an alternative connection, which starts with the device operation service IF 212, of the component 221h, the component 221e, the component 221b, and the document reading unit 12 in such an order.

(Step S307)

At this stage, the each unit control service 220 calls actually the function of each of the units of the image formation device via the connected each of the components.

The each unit control service 220 transceives data between each of the components 221 which are being in connection and otherwise in alternative connection in order to control the document reading unit 12.

In the examples shown in FIG. 12 and FIG. 13, the each unit control service 220 acquires image data of a document from the document reading unit 12 and transmits the image data to the device operation service IF 212. The image data is transmitted to the expanded function service 320.

Thereby, it is possible to utilize the hardware resources of the image formation device.

The each unit control service 220, when for example calling the function corresponding to the image processing function service, acquires image data and the like from the expanded application 400, identifies a function of the image processing, and executes the identified function of the image processing. In this case, the each unit control service 220 reads the document from the document reading unit 12 and stores the same as image data, or the each unit control service 220 reads the stored image data from the storage unit 19 and causes the image processing function service to execute processings that include, for example, expansion of image data, reduction of image data, color conversion of image data, noise removal from image data, format conversion of image data, character recognition, watermark recognition. In addition, the each unit control service 220, when for example calling the function corresponding to the device operation service, causes the device operation service to execute processings that include, for example, drawing on the panel operation unit 16, controlling the FAX transceiving unit 18, user authentication, driving the conveyer unit 14, acquiring a status of each of the units. Further, the each unit control service 220, when calling the function corresponding to the network communication service, causes the network transceiving unit 15 to execute processings that include, for example, file transceiving using various protocols, streaming, and authentication data transceiving or the like through the network communication service.

Thereafter, the each unit control service 220 terminates the each unit function calling processing.

(Step S308)

If calling a function is not impossible due to no alternative connection or the like, the each unit control service 220 executes an error notification processing.

The each unit control service 220 sends a message whose gist is that calling a function is incapable to the platform service IF unit 210. The platform service IF unit 210, which receives this message, notifies this message to the expanded function service 320. The expanded application 400, which is the last receiver of this message, executes processings that include, for example, error indication and entering in a log.

Then, the each unit function calling processing according to the present exemplary embodiment terminates.

With the aforementioned configuration, the following effects can be obtained.

Recently, due to the development of utilizing mobile terminals in business which include, for example, smartphones and tablets, and wide spreads of cloud services and social networking services (SNS) etc., the IT infrastructure per se is made changed drastically, which requires to cope with speed evolution of IT technology.

However, the commonly used platforms described in Patent Literature 1 have to be prepared separately on product-by-product basis, which makes the development costly.

To the contrary, the image formation device of present exemplary embodiment is featured to include the device control platform 200 that manages the hardware resource on the OS 230, the standard application execution unit 100 that executes a standard application 120 that utilizes the hardware resource that is under the management of the device control platform 200, and the expanded application platform 300 that includes the standard function service 310 allowing the standard application 120 to utilize the function to be executed by the standard application execution unit 100, the expanded function service 320 allowing for a utilization the hardware resource, and the expanded application management unit 340 managing and executing the expanded application 400 that is capable of calling individually the standard function service 310 and the expanded function service 320, and the platform service IF unit 210 providing the interface for utilizing, from the outside of the device control platform 200, the hardware resource corresponding to the expanded function service 320, the device control platform 200 including the each unit control service 220 that is configured by combining the components 221, the components 221 including the common interface corresponding to each of the functions of the hardware resources that are utilized via the platform service IF unit 210.

By employing such a configuration, it is possible to create a same platform even for different product lines and therefore reusability of platform is enhanced for developing into various product lines. In addition, preparing the component 221 that relies on the performance of a device allows for using the same device control platform 200 even if the performances are different in the same product line, enabling the scalable. In other words, even if a product is a single function printer or even an MFP which are different product lines, it is possible to create the each unit control service 220 in an easy way using the component 221, allowing for reducing the development costs. In addition, it is also possible to provide a combination of the components 221 whose object is realize an easy introduction of new technology.

Further, it is also possible to create firstly a component 221, for which performance is hardly necessary, using the high-level language such as Java (Registered Trademark) or the like and thereafter provide the component 221 after being optimized by using the low-level language such as C language or the like to cope with the product development. Moreover, even if the component 221 within the device control platform 200 undergoes a replacement in a case where a new product is being developed or a new technology is to be introduced for meeting with the user's desire, no influence is provided on the standard application 120 and the expanded application 400, thereby achieving an easy correspondence.

Moreover, the layered expanded application platform 300 allows the expanded application 400 to utilize the function of the standard application 120 or the hardware resource corresponding to each of the units thereof. Thus, it is easy to achieve a customization that changes the configuration on customer basis, which allows providing image formation devices with reduced development costs.

More specifically, in light of coping with various customers' desire and all possible customization, the image formation device of the present exemplary embodiment may be developed quickly using a script language or the like if only the function of the standard application 120 is requested to utilize. To the contrary, if a customization is necessary in which the hardware resource is to be controlled in a direct manner, it is possible to call the function of each of the units with bypassing the standard application 120. In this way, the image formation device of the present exemplary embodiment is capable of corresponding to the level differences between the necessary customizations in an easy way by causing the layered expanded application platform 300 to absorbing the level differences. In addition, expanding the layered service clarifies a corresponding range of customization, which may be able to development of the expanded application 400 in an easy way. Further, it is unnecessary to prepare specially the SDK (Software Development Kit), the NDK (Native Development Kit) and the like which are of different levels.

Moreover, the image formation device of the present exemplary embodiment is of a software architecture in which the platforms are layered, which makes it possible to correspond to the customizations that meet with various customers' requests. For this reason, it is possible to shorten the developing period of a product corresponding to a new service which the customer desires, and provide the product as an image formation device on which the customer desired new technology is reflected promptly and which is inexpensively and quickly provided with optimal performances and functions.

Moreover, the image formation device according to the present exemplary embodiment has a feature to be configured such that the components 221 of the each unit control service 220 are arranged to correspond to the plural layers and are connected between the layers.

With this configuration, it is possible to provide the lower layer components 221 by the interfaces whose types are unified by the device control platform 200, which makes it possible to omit labor for the development that is followed by the reduction of the developing costs. In addition, it is possible to prepare the components 221 depending on the layer which are created by one of languages that include, for example, the high-level language and the low-level language, thereby increasing the performance at the time of calling the function. Thus, it is possible to increase, for example, the speeds of the standard application 120 and the expanded application 400 during their executions.

Further, as described in the foregoing each unit function calling processing, the plural alternative connections are capable of change dynamically the configuration of the each unit control service 220, which makes it possible to achieve an easy correspondence to that the image formation device is changed after being shipped from the factory. Furthermore, even a connection of option equipment or the like, or even upgrading the option board or the like, the alternative connection changes the each unit control service 220 immediately and therefore its function is available, resulting in a reduction of supporting costs.

Moreover, in general, for ease of developing an application that is to be run on a platform, using a common interface is available for connecting the components 221, which makes it possible to establish an easy application development.

In addition, the image formation device according to the third exemplary embodiment is featured to further include the standard application service IF unit 110 that provides the interface for utilizing the function of the standard application 120 from the outside of the standard application execution unit 100.

With this configuration, it is possible to establish an easy provision of the interface that is of a unified type between the device control platforms 200, which makes it possible to provide a unified developing environment under which the expanded application 400 is created and to reduce the developing costs.

Further, it is possible to cause the hardware resource to be executable easily that is to be utilized by the device control platform 200 from the expanded application 400. Thus, the performances of the expanded application 400 can be improved which include, for example, the speed during execution thereof.

In summary, until now, the technology disclosed in Patent Literature 1 is compelled to prepare platforms separately in order to correspond to product lines that include low priced printers and high performance MFPs, which raises a problem of needing a high developing costs.

To the contrary, according to the present exemplary embodiment, the each unit control service that is configured by a combination of the components (parts), each of which includes the common interface corresponding to each of the functions of the hardware resource, makes it possible to create the same platform despite of different product lines, thereby providing the image formation device with reduced developing costs.

Fourth Exemplary Embodiment

Figure 14:
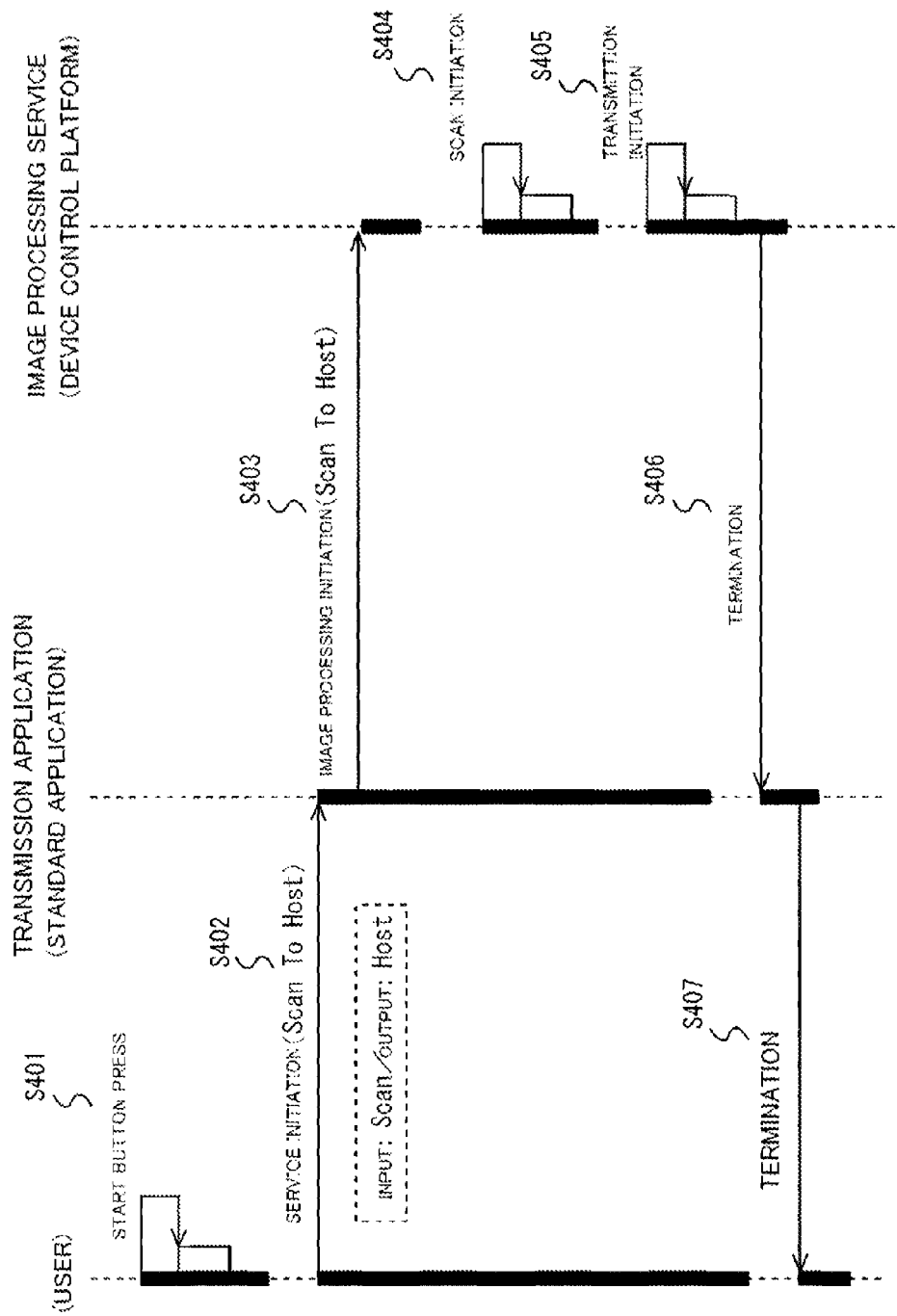
FIG. 14 is a flowchart for explaining an image processing by an image formation device according to a fourth exemplary embodiment, for example, for explaining a standard function of a transmission application.
Figure 15:
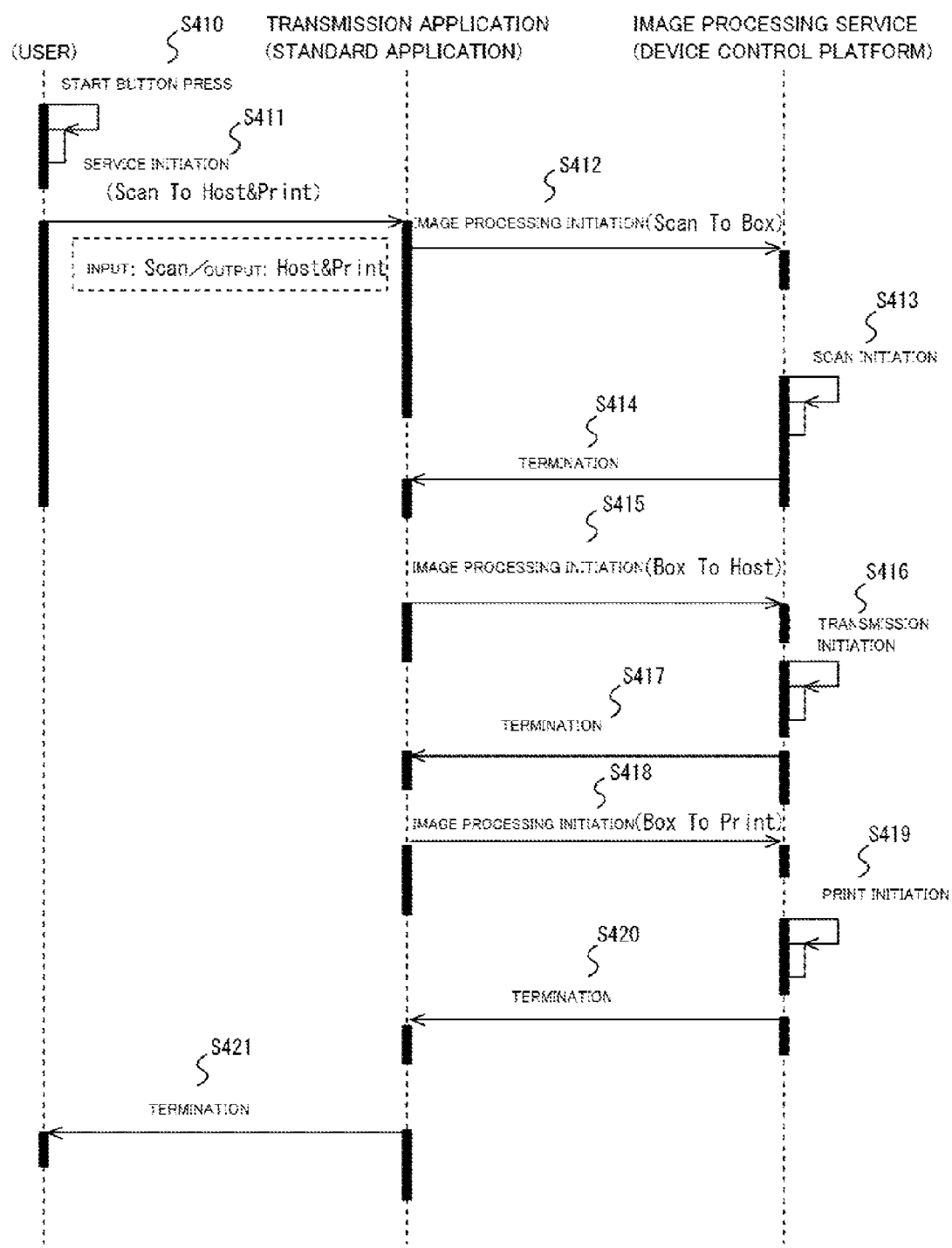
FIG. 15 is a flowchart for explaining, a case wherein the standard function of the transmission application shown in FIG. 14 is added with (expanded to), for example, a function that is configured to print a document after being transmitted as a duplicated copy.

Next, with reference to FIG. 14 through FIG. 15, a description is made as to an image formation device according to a fourth exemplary embodiment of the present invention.

The image formation device of the third exemplary embodiment is similar to the image formation device 1 (FIG. 1) of the first exemplary embodiment in system configuration, and is similar to the image formation device 1 and the image formation device of the second exemplary embodiment in function configuration (FIG. 2 and FIG. 7).

In addition, the platform service IF unit 210 (FIG. 2 and FIG. 7) provides the interface for enabling the utilization of the hardware resources from the outside of the device control platform 200.

The platform service IF unit 210 calls the each unit control service 220 for utilizing the hardware resource of each of the units of the image formation device according to the fourth exemplary embodiment. The platform service IF unit 210 may be provided as an API or the like, or a service or the like on the OS 230. In addition, the platform service IF unit 210 may be provided as C language structure, C++ language class, another object, a routine, a function, a header file, an object, a library, or the like (which is hereinafter referred to as "class or the like"). In addition, the platform service IF unit 210 may be provided as, for example, an intermediate language such as Java (Registered Trademark) or the like.

Further, the platform service IF unit 210, which includes the following general-purpose interfaces (1) through (6), provides the general-purpose interfaces in response to a request from the standard application 120. It is to be noted that the following device is a hardware resource.
(1) To construct an image processing service which the platform side provides as units of one device input to one device output.
(2) To establish a configuration that enables an association between the image processing services such that the plural image processing services designate a document box device, the document box device being a document box allocated in any storage (for example, storage unit 19) to be called a device, the document box device being included in each of input and output devices.
(3) To establish a configuration that allows for adding an image page to previously one or more image pages stored in a document box by issuing a designation of the same document box to the output device.
(4) To establish a configuration which allows for setting a manner of outputting the content stored in the document box on a page unit basis and to change the image outputting manner by altering the setting.
(5) To establish a configuration which allows for the deletion and/or change of sequence of a page stored in the document box.
(6) To establish a configuration which allows for editing an image stored in the box to an image depending on the box outputting method by designating the input and output devices in the same document box.

It is to be noted that the general-purpose interfaces are to be detailed later.

[Image Processing by Image Formation Device of the Fourth Exemplary Embodiment]

Next, with reference to FIG. 14 through FIG. 15, a description is made as to an image processing performed by the image formation device according to the fourth exemplary embodiment of the present invention. It is to be noted that in the following description is made based on a case of for example, a network transmission performed by the transmission application in each of the various standard applications 124 of the standard application 120. In addition, FIG. 14 is explained as to the standard function of the transmission application and FIG. 15 is explained as to a case in which the standard function of transmission application is added with (expanded to), for example, a printing function that prints an already transmitted document as a copy.

At first, as shown in FIG. 14, the user sets a document, makes transmission settings on the operation panel unit 16, and presses the start button of the operation panel unit 16 (STEP S401), a service is initiated (STEP S402). The transmission settings at this stage include, for example, to select a destination (HOST) using the operation panel unit 16. Here, the interface that is provided from the transmission application is assumed to be (Scan To Host). In brief, it is indicated that the input is in Scan, while the output is in HOST.

Next, the image processing is initiated (STEP S403) by the general-purpose interface (Scan To Host) that is provided following to the processing of the image processing service 221 of the each unit control service 220 of the device control platform 200. Here, the general-purpose interface (Scan To Host) that is provided following to the processing of the image processing service 221 of the each unit control service 220 corresponds to the interface (1), which is one of the general-purpose interfaces (1) through (5) which are provided by the aforementioned platform service IF unit 210.

At this time, the document reading unit 12 initiates to read (scan) a document (STEP S404). The read image data is stored in, for example, the box of the storage unit 19. After the image forming unit 17 performs an image formation based on the stored image data, the resulting image data is transmitted to the Host by the network transceiving unit 15 immediately when a transmission is initiated (STEP S405). When the transmission by the network transceiving unit 15 terminates, the processing of the image processing service 221 of the each unit control service 220 terminates (STEP S406), and then the processing of the transmission application also terminates (STEP S407).

It is to be noted that the reading (scanning) the document by the document reading unit 12, the image formation by the image forming unit 17, and the transmission or the like by the network transceiving unit 15 are performed by control related services which are provided from the image processing service 221, the device operation service 222, and the network communication service 223, respectively.

The above description is for the standard function of the transmission application.

Next, with reference to FIG. 15, in contrast to the standard function, a description is made as to an image processing case in which the standard function is added with (expanded to) a printing function that prints an already transmitted document as a copy. It is to be noted that the addition (expansion) of the function in such a case is to be implemented by installing (or updating) a newly developed transmission application that is developed for printing the already transmitted document as a copy.

At first, as shown in FIG. 15, the user sets a document, makes transmission settings on the operation panel unit 16, and presses the start button of the operation panel unit 16 (STEP S410), a service is initiated (STEP S411).

In the transmission settings at this stage, it is assumes that for example, the transmission application to which a function is added (expanded) causes the operation panel unit 16 to display a selection items for the designation (Host) and a selection item for transmission setting (with copy printing). At this stage, the transmission setting (with copy printing) is selected and then the designation (Host) is selected.

In addition, the interface provided from the transmission application shall be assumed to be the "Scan To Host & Print". That is to say, this indicates that the input is Scan and the output is Host & Print.

Next, the image processing is initiated (STEP S412) by the general-purpose interface (Scan To Box) that is provided following to the processing of the image processing service 221 of the each unit control service 220 of the device control platform 200. Here, the Box is, for example, a document box of the foregoing storage unit 19.

Also, the general-purpose interface (Scan To Box) that is provided following to the processing of the image processing service 221 of the each unit control service 220 corresponds to the interface (1), which is one of the general-purpose interfaces (1) through (6) which are provided by the aforementioned platform service IF unit 210.

At this time, the document reading unit 12 initiates to read (scan) a document (STEP S413). The read image data is stored in, for example, the box of the storage unit 19 similar to the above.

At this stage, when the document reading by the document reading unit 12 completes, the provision processing of the general-purpose interface (Scan To Box) that follows the image processing service 221 of the each unit control service 220 completes (STEP S414). Then, an image processing is initiated (STEP S415) by the general-purpose interface (Box To Host) that is provided by following the processing of the image processing service 221 of the each unit control service 220.

Here, the general-purpose interface (Box To Host) that is provided by following to the processing of the image processing service 221 of the each unit control service 220 corresponds to the interface (1), which is one of the general-purpose interfaces (1) through (6) which are provided by the aforementioned platform service IF unit 210.

At this time, the image forming unit 17 performs an image formation based on the image data store in the storage unit 19 and thereafter the resulting image is transmitted to the Host when the network transceiving unit 15 initiates its transmission activity (STEP S416). When the network transceiving unit 15 completes its transmission activity, the provision processing of the general-purpose interface (Box To Host) that follows the image processing service 221 of the each unit control service 220 completes (STEP S417).

Then, an image processing is initiated (STEP S418) by the general-purpose interface (Box To Print) that is provided by following the processing of the image processing service 221 of the each unit control service 220.

Here, the general-purpose interface (Box To Print) that is provided by following to the processing of the image processing service 221 of the each unit control service 220 corresponds to the interface (1), which is one of the general-purpose interfaces (1) through (6) which are provided by the aforementioned platform service IF unit 210.

At this time, the image forming unit 17 performs an image formation based on the image data stored in the document box of the storage unit 19 and initiates a printing on a recording sheet (print initiation) (STEP S419). When the printing on the recording sheet completes, the provision processing of the general-purpose interface (Box To Print) that follows the image processing service 221 of the each unit control service 220 completes (STEP S420), and the processing of the transmission application also completes (STEP S421).

It is to be noted that the reading (scanning) the document by the document reading unit 12, the image formation by the image forming unit 17, and the transmission or the like by the network transceiving unit 15 are performed, similar to the above, by control related services which are provided from the image processing service 221, the device operation service 222, and the network communication service 223, respectively.

It is to be noted that though the described is made as to the correspondence of the general-purpose interface (1), one of the general-purpose interfaces (1) through (5) which the foregoing platform service IF unit 210 provides, however, it is not limited thereto.

More specifically, for example, the general-purpose interface (2) allows plural image processing services designate the document box device, which makes it possible to achieve an addition (expansion) of a function that enable mutual collaboration between the image processing services. In addition, for example, the general-purpose interface (3) makes it possible to add (expand) a function that is capable of adding an image page to the already stored image page in the document box. Further, for example, the general-interface (4) makes it possible to add (expand) a function that is capable of changing the output setting on a page unit basis that is stored in the document box. Furthermore, the general-purpose interface (5) makes it possible to add (expand) a function that is capable of achieving a deletion or order change of the page stored in the document box. Moreover, for example, the general-purpose interface (6) makes it possible to add (expand) a function that is capable of editing the box storage image to an image depending on the box output method.

In either case, causing the general-purpose interface that the platform service IF unit 210 provides to be either of the foregoing general-purpose interfaces (1) through (6) makes it possible to add (expand), without having to change a side of the device control platform 200, a new function that is to be installed (or updated) by a new transmission application.

In addition, other than the transmission application, as to the copy application 121, the printer application 122, the FAX application 123, the various applications 124, and the like of the standard application 120, it is possible to add (expand) a new function without having to change a side of the device control platform 200.

Further, a combined utilization of the foregoing general-purpose interfaces (1) through (6) is capable of being applied to all functions.

In such a way, in the present exemplary embodiment, the device control platform 200 manages the hardware resources on the operating system (OS 230), the standard application execution unit (the standard application execution unit 100) causes the standard application (standard application 120) to execute which utilizes the hardware resources under the management of the device control platform 200, the application management unit (expanded application management unit 340) included in the expanded application platform (expanded application platform 300) manages and executes the standard function service 310 for enabling the utilization of the function of the standard application (standard application 120) to be executed by the standard application execution unit (standard application execution unit 100), the expanded function service 320 enabling the utilization of the hardware resources, and the expanded application (expanded application 400) that is capable of calling the standard function service 310 and the expanded function service 320 is managed and executed, and the general-purpose interfaces are provided which cause the platform service interface unit (platform service IF unit 210) to utilize the hardware resources that correspond to the expanded function of the standard application (standard application 120) from the outside of the device control platform 200.

Thereby, the functions which the platform (device control platform 200) side provides become free from any restriction, which makes it possible to expand the function of the application without having to implement an updating of the platform (device control platform 200) side.

In addition, in the present exemplary embodiment, only an expansion of the function is required during developing an application, which makes it possible to corresponding to an individual product specification flexibly and effectively.

Further, the present exemplary embodiment includes the expanded application platform 300 that includes the standard function service 310 allowing the standard application 120 to be executed by the standard application execution unit 100 to utilize the function corresponding to the standard application service IF unit 110, the expanded function service 320 allowing for a utilization of the hardware resource corresponding to the platform service IF unit 210, and the expanded application management unit 340 that manages and executes the expanded application 400 that is capable of calling the standard function service 310 and the expansion function service 320.

Thereby, the function of the standard application 120 or hardware resources corresponding to each of the units are made available from the expanded application 400, which make it possible to achieve easily a customization which changes the configuration pursuant to a user with reduced developing costs.

In other words, the image formation device of the present exemplary embodiment may be developed quickly using a script language or the like if only the function of the standard application 120 is requested to utilize. To the contrary, if a customization is necessary in which the hardware resource is to be controlled in a direct manner, it is possible to call the function of each of the units with bypassing the standard application 120.

In summary, until now, the technology in Patent Literature 1 fails to develop an application that is in excess of the function provided by the platform due to restriction underlies therein. For such a reason, there is a problem of updating the platform side for expanding the function of the application.]

In contrast, the image formation device, the image forming method, and the image forming program all of which are according to the present exemplary embodiment, there are no restrictions in the function that the platform (device control platform) side provides, which makes it possible to causes the application to expand the function without having to updating the platform (device control platform) side.

Fifth Exemplary Embodiment

Next, with reference to FIG. 16 through FIG. 19, a description is made as to an image formation device according to a fifth exemplary embodiment of the present invention.

Figure 16:
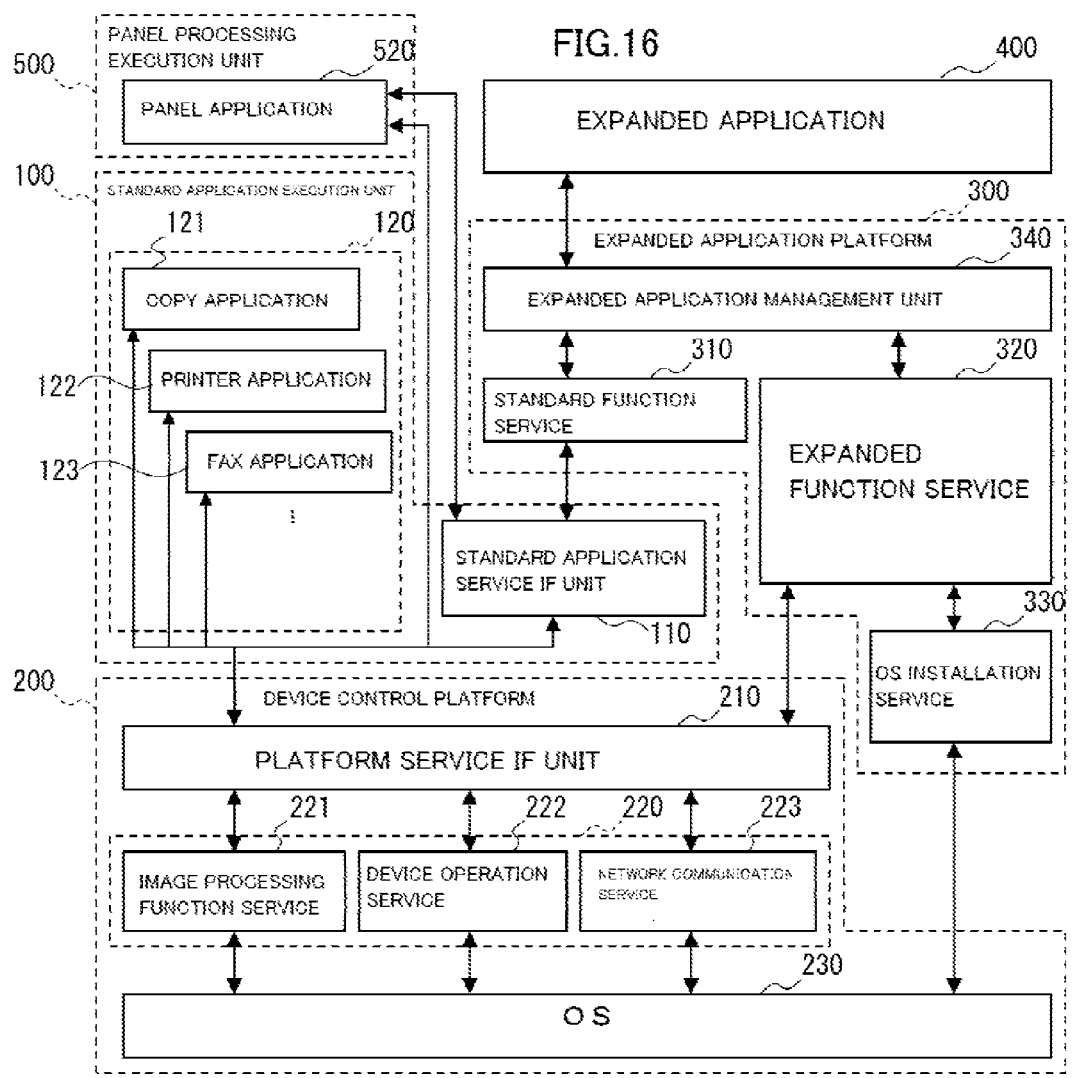
FIG. 16 is a blockdiagram of a control configuration of an image formation device of a fifth exemplary embodiment.

First of all, with reference to FIG. 16, a control configuration of the image formation device according to the fifth exemplary embodiment of the present invention is described.

The image formation device of the fifth exemplary embodiment is similar to the image formation device 1 (FIG. 1) of the first exemplary embodiment in system configuration. In the image formation device of the second exemplary embodiment, the same reference numbers are designated to the same elements having the same reference numbers as in the image formation device 1 (FIG. 2) of the first exemplary embodiment.

The image formation of the fifth exemplary embodiment, which is of a layered block structure, includes the standard application execution unit 100 (standard application execution unit), the device control platform 200, the expanded application platform 300 (the expanded application platform) and the expanded application 400. If the control unit 10 causes the control program of the present invention to execute, the standard application execution unit 100, the device control platform 200, and the expanded application platform 300 are realized. Further, the control unit 10 is capable of, based on a control configuration shown in FIG. 16, executing the expanded application 400, the standard application 120, and the OS 230. In detail, the expanded application 400 is executed on the expanded application platform 300. In addition, other than the expanded application platform 300, the image formation device further includes the panel processing execution unit 500 that manages and executes the standard application 120. The panel processing execution unit 500 is also realized when the control unit 10 execute the control program of the present invention.

The panel processing execution unit 500 of the present exemplary embodiment executes the panel application 520 to execute processings that include a processing corresponding to the operation of the operation panel unit 16, a common processing between the standard applications 120, and a processing for calling the standard application 120.

In addition, the panel processing execution unit 500 causes the standard application service IF unit 110 to call the standard application 120 or to call the standard application 120 directly.

The panel processing execution unit 500 includes a panel application 520.

The panel application 520 is a dedicated application for a processing of the operation panel unit 16. The panel application 520 includes, for example, programs and data, the programs including, for example, a processing in response to the operation of the operation pane unit 16, a common processing between the standard applications 120, and a processing calling the standard application 120.

The panel application 520 may include, as the processing in response to the operation of the operation pane unit 16, for example, processings to correspond to a user's instruction from the input part 20 of the operation panel unit 16 and to correspond to an operation such as an indication on the display part 21. In detail, the panel application 520 may include processings such as displaying each of the units depending on button condition of the input part 20 and displaying a screen via which each of the application applications 120 and the expanded application 400 are selected for execution.

In addition, the panel application 520 may include, as the common processing between the standard applications 120, a processing of input and display of GUI that is to be commonly used between the standard applications 120 or a common processing related to a job corresponding to each of the standard applications 120. Further, the panel application 520 may include, as the common processing, for example, a processing that causes a dedicated browser or the like to perform an input operation by the commonly utilized input part 20 of the GUI or a display operation or the like on the display part 21. Furthermore, the panel processing execution unit 500 may output the result of the common processing in terms of displayed on the display part 21, recorded in the image forming unit 17, and transmitted from the network transceiving unit 15. Moreover, the panel processing execution unit 500 may manage the standard applications 120. It is to be noted that the common processing between the standard applications 120 is not necessary to be for between all the standard applications 120 and therefore, for example, may be for between two or more standard applications 120.

Moreover, the panel application 520 may include, as the processing of calling the standard application, for example, a processing of calling the standard application 120 via the standard application service IF unit 110 or a processing of calling the standard application 120 directly. Still moreover, the processing of calling the standard application 120 may include a processing of calling a part of the standard application 120 for utilizing the function thereof.

Besides, the panel application 520 may be configured so that changing screen data depending on different products makes it possible to be used on a common operation system. Moreover, the panel application 520 may also include a processing of calling the expanded application 400.

Besides, the panel application 520 may be included in the firmware when the image formation device is shipped from the factory. Moreover, the panel application 520 may also be, for example, updated or changed in concurrence with an updating or the like of the firmware which are performed by the OS install service 330.

[Panel Application Execution Processing by Image Formation Device of the Fifth Exemplary Embodiment]

Figure 17:
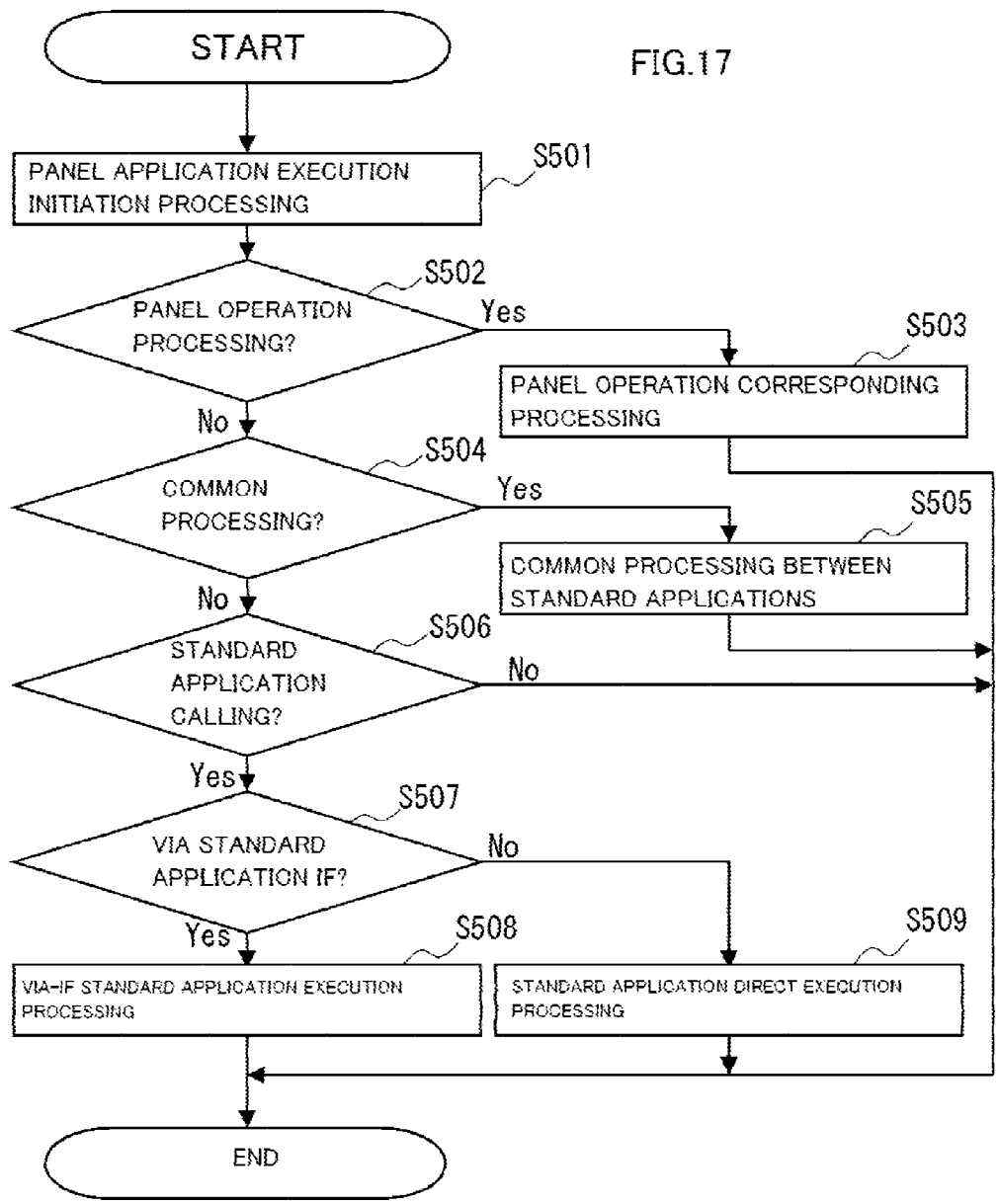
FIG. 17 is a flowchart that is illustrative of a panel application execution processing according to the fifth exemplary embodiment.
Figure 18:
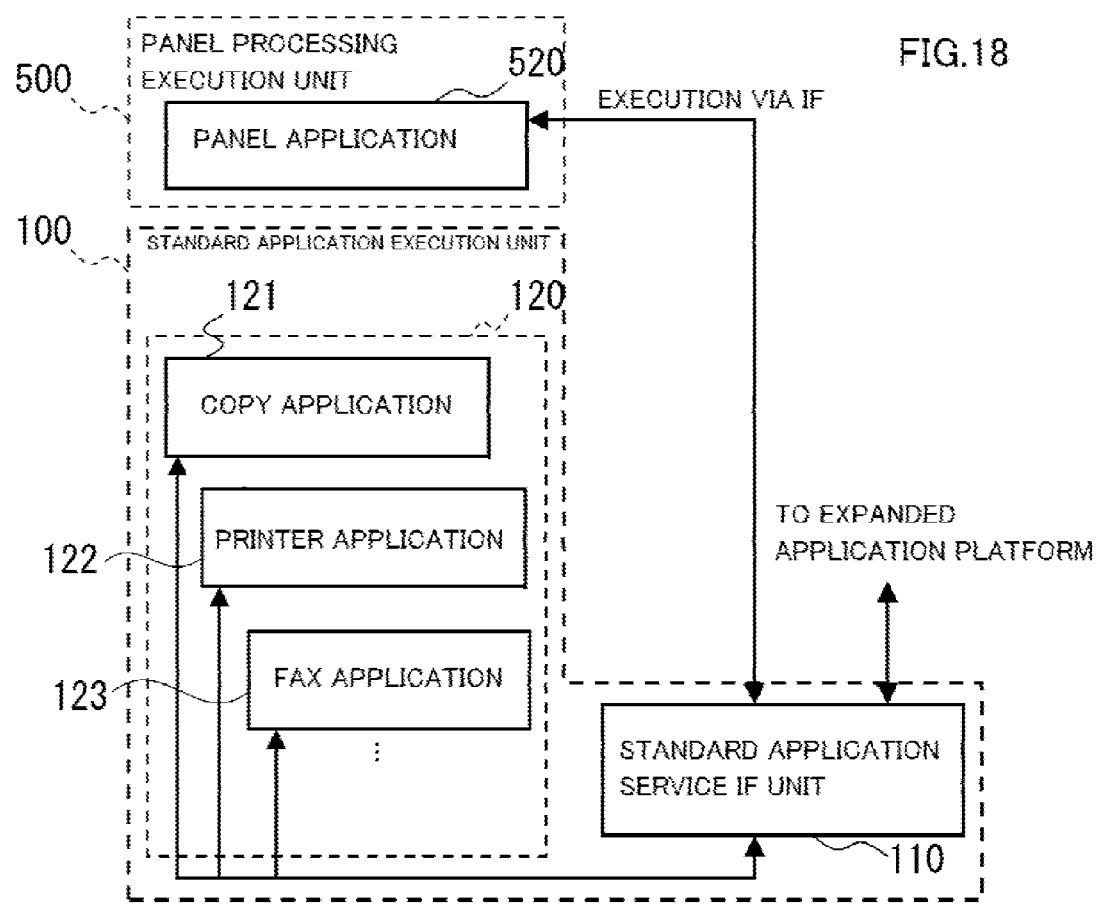
FIG. 18 is a flowchart that is illustrative of a conceptual illustration of a via-IF standard application execution processing shown in FIG. 17.

Next, with reference to FIG. 17 through FIG. 19, a description is made as to a panel application execution processing that is performed by the image formation device according to the fifth exemplary embodiment of the present invention.

The panel application execution processing of the present exemplary embodiment causes the panel application 520 to execute the processing of corresponding to the operation of the operation panel unit 16 or the common processing between the standard applications 120. In addition, the standard application 120 is to be called directly or via the standard application service IF unit 110.

Panel application execution processing of the present exemplary embodiment causes mainly the control unit 10 of the image formation device of the present exemplary embodiment to execute, in collaboration with each of the units, the program stored in the storage unit 19 using the hardware resources.

Hereinbelow, with reference to a flowchart shown in FIG. 17, a detailed description is made as to the panel application execution processing in a step by step manner.

(Step S501)

First of all, the panel processing execution unit 500 performs a panel application execution initiation processing.

The panel processing execution unit 500 initiates the panel application 520 initiates the panel application execution initiation processing, for example, when a power switch (not shown) of the image formation device of the present exemplary embodiment is made ON, or when the power is restarted from the power saving state by pressing the button of the input unit 20 of the operation panel unit 16.

The panel processing execution unit 500 acquires a user's instruction from the input part 20 of the operation panel unit 16 by processing the panel application 520.

The panel processing execution unit 500 may also acquire data of a job from such as the network transceiving unit 15, the FAX transceiving unit 18, or the like.

(Step S502)

Next, the panel processing execution unit 500 determines whether or not the processing of panel operation is to be executes. The panel processing execution unit 500 determines Yes if the processing corresponding to the operation of the panel unit 16 execute. Otherwise, the panel processing execution unit 500 determines No.

In a case of Yes, the panel processing execution unit 500 causes the processing to STEP S503.

In a case of No, the panel processing execution unit 500 causes the processing to STEP S504.

(Step S503)

In a case of executing the processing of the panel operation, the panel processing execution unit 500 performs the panel operation corresponding processing.

The panel processing execution unit 500 executes the processing of the panel operation corresponding to the user's instruction that is acquired from the input part 20 of the operation panel 16.

The panel processing execution unit 500, for example, draws a image of an condition of each of the units on the browser which corresponds to a condition, such as the operation mode or the like, of the button of the input part 20 and displays the image on the display unit 21. In this case, the panel processing execution unit 500 may read data from the storage unit 19 which indicates the condition of each of the units which various standard applications 120 acquire. In addition, the panel processing execution unit 500 may acquire the condition of each of the units by causing the device control platform 200 to call the function of each of the units. Further, the panel processing execution unit 500 may display a selection screen on the display part 21, the selection screen being for calling the function of each of the standard applications 120. Moreover, the panel processing execution unit 500 may install a selection screen on the display part 21 for selecting the expended application 400 or installing the same.

Thereafter, the panel processing execution unit 500 causes the panel application execution processing terminates. It is to be noted that after the termination of the panel application execution processing the panel processing execution unit 500 also waits for an instruction from the input part 20 of the operation panel unit 16 or acquiring data of a job.

(Step S504)

In a case of not executing the processing of the panel operation, the panel processing execution unit 500 determines whether or not the panel processing execution unit 500 executes the common processing between the standard applications 120. In a case of executing the common processing between the standard applications 120, the panel processing execution unit 500 determines Yes. Otherwise, the panel processing execution unit 500 determines No.

In a case of Yes, the panel processing execution unit 500 causes the processing to STEP S505.

In a case of No, the panel processing execution unit 500 causes the processing to STEP S506.

(Step S505)

In a case of executing the common processing between the standard applications 120, the panel processing execution unit 500 performs a common processing of between standard applications.

The panel processing execution unit 500 may display, as a GUI processing, various screens on the display part 21 of the operation panel unit 16 which include, for example, an error indication screen and an authentication screen. In addition, the panel processing execution unit 500 may display, on the display part 21, a screen for calling the function of each of the standard functions 120. Further, the panel processing execution unit 500 may execute, for example, a common processing related to a job corresponding to each of the standard applications 120. The panel application 520, may transmit, for example, image data and document data, which are received via the network transceiving unit 15 or the FAX transceiving unit 18, to the printer application 122 or the FAX application.

In addition the panel processing execution unit 500 may output the results of these common processings in various forms that include, for example, a display on the display part 21 of the operation panel unit 16 or the like, recording on a recording sheet at the image forming unit 17, and a transmission to a server (not shown), a terminal device, or the like, using the network transceiving unit 15. Further, the panel processing execution unit 500 may display a screen on the display part 21 which is for conducting management activities including, for example, an installation, a setting change, and a deletion of each of the standard applications 120.

Thereafter, the panel processing execution unit 500 causes the panel application execution processing to terminate.

(Step S506)

At this stage, the panel processing execution unit 500 determines whether or not the standard application 120 is to be called. In a case of calling for utilizing the function of the standard application 120 by the user's instruction, job data, or the like, the panel processing execution unit 500 determines Yes. Otherwise, that is to say, in a case of performing the processing corresponding to the operation of the operation panel unit 16, the panel processing execution unit 500 determines No.

In a case of Yes, the panel processing execution unit 500 causes the processing to STEP S507.

In a case of No, the panel processing execution unit 500 causes the processing to STEP S508.

(Step S507)

In a case of calling the standard application 120, the panel processing execution unit 500 determines whether or not the standard application 120 is to be called via the standard application service IF unit 110. If calling the standard application 120 is via the standard application service IF unit 110, the panel processing execution unit 500 determines Yes. Otherwise, that is to say, if calling the standard application 120 is performed directly, the panel processing execution unit 500 determines No.

In a case of Yes, the panel processing execution unit 500 causes the processing to STEP S508.

In a case of No, the panel processing execution unit 500 causes the processing to STEP S509.

(Step S508)

In a case of calling the standard application 120 via the standard application service IF unit 110, the panel processing execution unit 500 and the standard application service IF unit 110 perform via IF application execution processing.

As seen in FIG. 18, the panel processing execution unit 500 notifies the function of the to-be-called standard application 120 to the standard application service IF unit 110. The standard application service IF unit 110 utilizes this function by executing the standard application 120 corresponding to this notification and notifies a result of this utilization to the panel processing execution unit 500.

The standard application service IF unit 110 may, for example, cause the operation panel unit 16 to display a copy initial screen on the operation panel unit 16 in case of calling the copy application 121. In addition, the standard application service IF unit 110 may output data of a job which the expanded application 400 acquires or designates in a case of calling the printer application 122. Further, the standard application service IF unit 110 may cause the expanded application 400 to acquire fax-received image data by designation or allow for a transmission of a file or the like which are designated by the expanded application 400, in a case of calling the FAX application 123. Moreover, the standard application service IF unit 110 may perform an installation, a deletion, and a setting changing of the standard application 120.

It is to be noted that the panel processing execution unit 500 may make a transmission to the expanded application platform 300 via the standard application service IF unit 110 in a case where the input part 20 is inputted with a user's instructions related to selecting or installing the expanded application 400.

Thereafter, the panel processing execution unit 500 terminates the panel application execution processing.

(Step S509)

In a case of calling the standard application 120 directly, the panel processing execution unit 500 performs a standard application direct execution processing.

As seen from FIG. 19, similar to the foregoing standard application service IF unit 110, the panel processing execution unit 500 may call each of the standard applications 120 for utilizing their functions.

In addition, the panel processing execution unit 500 may perform a processing that is more corresponding to the inner processing of the standard application 120 such as a partial calling of the function of the standard application 120 for the utilization thereof. Further, the panel processing execution unit 500 may, for example, acquire properties of copy which include, for example, resolution and color of copy, and to display the resulting properties on the display unit 21 in a case of calling the copy application 121. Furthermore, the panel processing execution unit 500 may, for example, acquire job stored in the storage unit 19 for printing and a list of document files in the document box, and display the acquired items on the display part 21 in a case of calling the printer application 122. Moreover, the panel processing execution unit 500 may, for example, acquire a list of fax-received image data and a list of reception sources, and a list of transmission standby document data to display on the display unit 21 in a case of calling the FAX application 123.

It is to be noted that while the panel processing execution unit 500 is executing one of the standard application 120 after calling the standard application 120, the panel processing execution unit 500 may perform a processing of calling a part of another of the standard applications 120. The panel processing execution unit 500 may call, while the FAX application 123 or the like is executing, a processing that displays the list of the document file of this copy application 121.

In addition, the panel processing execution unit 500 may perform a processing that calls the plural standard applications 120 and displays the same in a separate manner in terms of windows or tab indications. Further, the panel processing execution unit 500 may call each of the standard applications 120 in a protected memory region using a virtual machine or the like.

Moreover, in a case of calling the function of each of the units, the panel processing execution unit 500 cause the platform service IF unit 210 to call directly the hardware resources for the utilization thereof. In this case, the platform service IF unit 210 calls the function of each of the each unit control services 220 which correspond to the called functions for the utilization.

Then, the panel application according to the present exemplary embodiment terminates.

With the foregoing configuration, the following effects can be obtained.

In a typical platform as described in Patent literature 1, a screen control related to each of services and a control of an operation or the like of the input part are executed separately by each of applications. In the platform having such a configuration, in a case where applications are prepared in different forms for the functions of copy, printer, FAX, and the like, if a common processing is included in the applications, each of the applications come to be in a redundant configuration, which consumes the storage area in a waste manner.

In contrast, the image formation device is featured to include the device control platform 200 that manages the hardware resource on the OS 230, the standard application execution unit 100 that executes a standard application 120 that utilizes the hardware resource that is under the management of the device control platform 200, the expanded application platform 300 that includes the standard function service 310 allowing for a utilization of the function corresponding to the standard application service IF unit 110 from the standard application 120 to be executed by the standard application execution unit 100, the expanded function service 320 allowing for a utilization of the function of the hardware resource corresponding to the platform service IF unit 210, the expanded application management unit 340 managing and executing the expanded application 400 that is capable of calling the standard function service 310 and the expanded function service 320, and the panel processing execution unit 500 that causes the panel application 520 to execute the processing corresponding to the operation panel unit 16 which acquires the user's instruction, the common processing between the plural standard applications 120, and the processing of calling the standard applications 120.

With this configuration, the common processings related to the operation panel unit 16 can be summarized, which make it possible to constitute a configuration which eliminates redundant parts. More specifically, it is possible to summarize the common processings between the plural standard applications 120, which makes it possible to save the storage area of the storage unit 19. In addition, as needed, the execution of the processing of calling the standard application 120 by the dedicated panel processing execution unit 500 brings an unnecessity of a recursive calling such as the calling one of the standard application 120 from another standard application 120, which makes it possible to save the storage area of the stack or the like.

Besides, in the typical platform, in a case where the common processing between plural applications has to be changed on a product basis, the platform per se is required to be changed. Thus, in case of a lead-off development of the platform, the change is required during the development, which is burden on a person in charge of this development of the platform. In addition, at a timing of the development, changing the platform is required, thereby lengthening the developing time. Thus, the developing costs are increased.

In contrast, the image formation device of the present exemplary embodiment causes the panel processing execution unit 500 the processing of corresponding to the operation panel unit 16, as the panel application 520 that summarizing the dedicated common processings, apart from the expanded application platform 300. Thereby, only changing the panel application 520 is requested for each product, which relief person in charge of this development of the platform. In addition, as to a screen that is common to each of the standard applications 120, the screen being to be allocated on the panel application 520, the screen being such as error and authentication screen of GUI which expands between each of the standard applications 120, their creations and tests are unnecessary whenever each of the standard applications 120 is developed. Further, causing the panel application 520 to include therein a screen that is to be changed for each product makes it possible to achieve an effective development on a product basis.

Furthermore, in the common processing for the operation panel unit 16, only performing an operation check for the panel application 520 is required, thereby reducing the developing time. Moreover, even before the completion of the expanded application platform 300, it is possible to perform the operation check for the panel application 520 using an emulator or the like, which allows for an implementation of the function on the operation panel unit 16 along a developing process.

Thereby, it is possible to improve the developing effectiveness and reduce the developing costs.

Besides, the image formation device of the present exemplary embodiment causes the layered expanded application platform 300 to allow for utilizing the function of the standard application 120 or the hardware resource correspond to each of the units respectively from the expanded application 400. Thus, it is possible to provide the image formation device that is capable of achieving a customization in an easy way which changes the configuration pursuant to a user with reduced developing costs.

Besides, the image formation device according to the present exemplary embodiment is featured to include the standard application service IF unit 110 that provides the interface for utilizing the function of the standard application 120 from the outside of the standard application execution unit 100, wherein the panel processing execution unit 500 causes the standard application service IF unit 110 to execute the standard application 120 or executes directly the standard application 120.

With this configuration, executing the standard application 120 by the standard application service IF unit 110 makes it possible to realize the processing of executing the standard application 120 in an easy way, thereby reducing the developing costs. In addition, the interface that is common to the panel application 520 and the expanded application 400 is available for calling the standard application 120. Thus, unifying the operability and at-a-glance looks makes improve the user convenience.

Further, the standard application service IF unit 110 allows the operation panel unit 16 to access, using the interface similar to each of the standard applications 120, the expanded application platform 300 and the expanded application 400 in a mutual manner, thereby enabling an association between the operation panel unit 16 and the expanded application 400 in an easy way.

On the other hand, the panel processing execution unit 500 is also capable of executing the standard application 120 directly. Thereby, it is possible to utilize some of the functions of the standard application 120 which is not accessible from the expanded application 400. Furthermore, it is possible to utilize the standard application 120 without degrading the performances that include, for example, a speed. Thereby, it is possible to extract the function of each of the standard applications 120 in a flexible manner which should be called from the operation panel unit 16 and realize the user's requests including, for example, customization in an easy way.

Besides, it is possible to provide easily the interface having a format of the unified standard application 120 and device control platform 200, which provides unified developing environments of the expanded application 400 in an easy way, thereby reducing the developing costs.

In addition, the function of the standard application 120 and the hardware resource to be utilized by the device control platform 200 are independently executable from the expanded application 400. Thus, it is possible to increase the performances including, for example, a speed while expanded application 400 is in execution.

It is to be noted that the execution of the panel application 520 by the panel processing execution unit 500 is described in the foregoing description of the fifth exemplary embodiment, however, it is possible to cause the standard application execution unit 100 to the panel application 520. Further, it is possible to employ a configuration which causes the standard application service IF unit 110 to included therein the function of the panel application 520.

With this configuration, it is possible to achieve an easy development of the panel processing execution unit 500 and a reduction of the total developing costs.

It is to be noted that the foregoing configurations and operations of the first through fifth exemplary embodiments are mere examples and, needless to say, may be properly modified and executed without departing from the spirit of the present invention.

The present invention may be applied to various information processing devices other than image formation devices. More specifically, it may be possible to employ a configuration that includes a server or the like which are separately connected, via a USB or the like, to a network scanner or a scanner. In addition, the present invention is also applicable to information processing devices that include, for example, a PC, a smartphone, a cell phone, office equipment, and industrial equipment into which an application can be installed.

The invention claimed is:

1. An image formation device, comprising:
a control unit, the control unit including a program that, when executed by the control unit, functions as:
a device control platform that manages a hardware resource in an operating system, wherein the hardware resource corresponds to each of a plurality of functions of the image formation device;
a standard application execution unit that executes a standard application that utilizes the hardware resource that is under the management of the device control platform; and
an expanded application platform that includes a standard function service allowing for a utilization of a function of the standard application executed by the standard application execution unit, an expanded function service allowing for a utilization of the hardware resource, and an expanded application management unit managing and executing an expanded application that is capable of calling individually the standard function service and the expanded function service,
wherein the device control platform includes an each unit control service that controls the hardware resource,
wherein when the expanded application management unit executes the expanded application, the standard function service performs to determine whether or not the standard application is to be called, and
call the standard application when the expanded application calls the standard function service via the expanded application management unit, and then the expanded function service performs to determine whether or not the each unit control service is to be called, and
call the each unit control service when the expanded application calls the expanded function service via the expanded application management unit,
wherein the standard application is provided with general-purpose interfaces for utilizing the hardware resource whose functions are expandable,
wherein the general purpose interfaces include:
(1) a first general purpose interface that is made available as multi hardware resource input-multi hardware resource output by repeating interruption/continuation;
(2) a second general purpose interface that allows for editing only inputted image data;
(3) a third general purpose interface that includes an interruption option and is capable of interrupting the each unit control service without having to start an output after image inputting;
(4) a fourth general purpose interface that includes a termination option and is capable of controlling the termination determination of the each unit control service by user side even if the each unit control service which is previously requested terminates; and
(5) a fifth general purpose interface that includes an output designation correction option that allows the user side to designate whether or not the system side can automatically correct to another appropriate output designation when an output to the user designated output destination terminates in failure, and
wherein the general-purpose interfaces are made available after being respectively set by the expanded function service.

2. The image formation device according to claim 1, wherein the expanded application platform includes an operating system installation service that adds a function to the operating system.

3. The image formation device according to claim 1 further comprising a standard application service interface unit that provides an interface for utilizing functions of the standard application from an outside of the standard application execution unit, and a platform service interface unit that provides an interface for utilizing the hardware resource from an outside of the device control platform.

4. The image formation device according to claim 1, wherein a setting that is made by the expanded function service is performed upon update of the expanded function service.

5. The image formation device according to claim 1 further comprising a platform service interface unit that provides an interface for utilizing the hardware resource whose functions are expandable from the outside of the device control platform, wherein the each unit control service is configured by combining components each of which includes a common interface corresponding to each of a plurality of functions of the hardware resource that are utilized via the platform service interface unit, wherein
the components of the each unit control service are arranged correspondingly to a plurality of layers and are connected between hierarchies in a dynamic manner,
the each unit control service tries to perform a calling function to call a function of the hardware resource via each of the components connected between hierarchies in hierarchy order,
the each unit control service calls the function of the hardware resource if the calling function terminates in success, and the each unit control service switches a connection route of the components and tries to call the function if the calling function terminates in failure.

6. The image formation device according to claim 5 further comprising a standard application service interface unit that provides an interface for utilizing, from the outside of the standard application execution unit, the function of the standard application which corresponds to the expanded function service.

7. The image formation device according to claim 1 further comprising a panel processing execution unit, as a different from the expanded application platform, which executes a process corresponding to the operation unit for acquiring a user's instruction, a common processing between a plurality of the standard applications, and a process for calling the standard application.

8. The image formation device according to claim 7 further comprising a standard application service interface unit that provides an interface for utilizing functions of the standard application from an outside of the standard application execution unit, wherein the panel processing execution unit causes the standard application service interface unit to call the standard application.

9. An image formation device, comprising:
a control unit,
the control unit including a program that, when executed by the control unit, functions as:
a device control platform that manages a hardware resource in an operating system, wherein the hardware resource corresponds to each of a plurality of functions of the image formation device;
a standard application execution unit that executes a standard application that utilizes the hardware resource that is under the management of the device control platform;
an expanded application platform that includes a standard function service allowing for a utilization of a function of the standard application executed by the standard application execution unit, an expanded function service allowing for a utilization of the hardware resource, and an expanded application management unit managing and executing an expanded application that is capable of calling individually the standard function service and the expanded function service,
wherein the device control platform includes an each unit control service that controls the hardware resource,
wherein when the expanded application management unit executes the expanded application, the standard function service performs to determine whether or not the standard application is to be called, and
call the standard application when the expanded application calls the standard function service via the expanded application management unit, and then
the expanded function service performs to determine whether or not the each unit control service is to be called, and
call the each unit control service when the expanded application calls the expanded function service via the expanded application management unit,
wherein the image formation device further comprises a platform service interface unit that provides an general-purpose interface for utilizing the hardware resource corresponding to an expanded function of the standard application from the outside of the device control platform,
wherein the device control platform has an image forming processing service that provides an image processing related service, and one or more general-purpose interfaces are provided along with a process of the image forming processing service pursuant to a request from the function-expanded standard application, and
wherein the general-purpose interface includes
(1) a first interface that constructs the image processing service which the platform side provides as units of one hardware resource input to one hardware resource output,
(2) a second interface that enables an association between a plurality of image processing services by designating a document box with the plurality of image processing services, wherein the document box is included in a hardware resource for input and output,
(3) a third interface that allows for adding an image page to one or more image pages previously stored in the document box by designating the same document box to the hardware resource for output,
(4) a fourth interface that allows for setting a manner of outputting the content stored in the document box on a page unit basis and to change the image outputting manner by altering the setting,
(5) a fifth interface that allows for the deletion and/or change of sequence of a page stored in the document box, and
(6) a sixth interface that allows for editing an image stored in the document box to an image depending on the box outputting method by designating the hardware resource for input and output in the same document box.

10. An image forming method that is executed by an image formation device provided with a hardware resource corresponding to a function of the image formation device, the method comprising the steps of:
managing the hardware resource in an operating system;
executing a standard application that utilizes the managed hardware resource; and
managing and executing an expanded application that enables a utilization of the hardware resource by allowing a function of the executed standard application for utilization, wherein
when the expanded application is executed, a standard function service determines whether the standard application is to be called and calls the standard application when the expanded application calls the standard function service, and then
an expanded function services determines whether to call an each unit control service that controls the hardware resource, and then call the each unit control service when the expanded application calls the expanded function service, and
wherein the standard application is provided with general-purpose interfaces for utilizing the hardware resource according to an expanded function,
wherein the general purpose interfaces include:
(1) a first general purpose interface that is made available as multi hardware resource input-multi hardware resource output by repeating interruption/continuation;
(2) a second general purpose interface that allows for editing only inputted image data;
(3) a third general purpose interface that includes an interruption option and is capable of interrupting the each unit control service without having to start an output after image inputting;
(4) a fourth general purpose interface that includes a termination option and is capable of controlling the termination determination of the each unit control service by user side even if the each unit control service which is previously requested terminates; and (5) a fifth general purpose interface that includes an output designation correction option that allows the user side to designate whether or not the system side can automatically correct to another appropriate output designation when an output to the user designated output destination terminates in failure, and wherein the general-purpose interfaces are made available after being respectively set by the expanded function service.

11. The image forming method according to claim 10, wherein a setting that is made by the expanded function service is performed upon update of the expanded function service.

12. The image forming method according to claim 10 further comprising the steps of providing an interface for utilizing the hardware resource from an outside, and managing the hardware resource by combining components each of which includes a common interface corresponding to each of the functions of the hardware resource that are utilized, wherein the components are arranged correspondingly to a plurality of layers and are connected between hierarchies in a dynamic manner, the each unit control service tries to perform a calling function to call a function of the hardware resource via each of the components connected between hierarchies in hierarchy order, the each unit control service calls the function of the hardware resource if the calling function terminates in success, and the each unit control service switches a connection route of the components and tries to call the function of the hardware resource if the calling function terminates in failure.

13. The image forming method according to claim 10, wherein a platform service interface unit provides a general-purpose interface for utilizing the hardware resource corresponding to an expanded function of the standard application from the outside of the device control platform, wherein the device control platform has an image forming processing service that provides an image processing related service, and one or more general-purpose interfaces are provided along with a process of the image forming processing service pursuant to a request from the function-expanded standard application, and the general-purpose interface includes (1) a first interface that constructs the image processing service which the platform side provides as units of one hardware resource input to one hardware resource output, (2) a second interface that enables an association between a plurality of image processing services by designating a document box with the plurality of image processing services, wherein the document box is included in a hardware resource for input and output, (3) a third interface that allows for adding an image page to one or more image pages previously stored in the document box by designating the same document box to the hardware resource for output, (4) a fourth interface that allows for setting a manner of outputting the content stored in the document box on a page unit basis and to change the image outputting manner by altering the setting, (5) a fifth interface that allows for the deletion and/or change of sequence of a page stored in the document box, and (6) a sixth interface that allows for editing an image stored in the document box to an image depending on the box outputting method by designating the hardware resource for input and output in the same document box.

14. The image forming method according to claim 10 further comprising the step of executing, independently from the management and execution by the expanded application platform, a process corresponding to the operation panel unit for acquiring a user's instruction, a common process between a plurality of the standard applications, and a process for calling the standard application.

* * * * *